US011249992B2

(12) United States Patent
Vertsel et al.

(10) Patent No.: US 11,249,992 B2
(45) Date of Patent: Feb. 15, 2022

(54) PARSING OF USER QUERIES IN A REMOTE NETWORK MANAGEMENT PLATFORM USING EXTENDED CONTEXT-FREE GRAMMAR RULES

(71) Applicant: ServiceNow, Inc., Santa Clara, CA (US)

(72) Inventors: Aliaksei Vertsel, Mountain View, CA (US); Dmitry Korolev, Bellevue, WA (US); Mikhail Rumiantsau, Mountain View, CA (US)

(73) Assignee: ServiceNow, Inc., Santa Clara, CA (US)

(*) Notice: Subject to any disclaimer, the term of this patent is extended or adjusted under 35 U.S.C. 154(b) by 357 days.

(21) Appl. No.: 16/539,731

(22) Filed: Aug. 13, 2019

(65) Prior Publication Data

US 2020/0097472 A1 Mar. 26, 2020

Related U.S. Application Data

(60) Provisional application No. 62/734,916, filed on Sep. 21, 2018, provisional application No. 62/741,935, filed on Oct. 5, 2018.

(51) Int. Cl.
*G06F 16/24* (2019.01)
*G06F 16/2452* (2019.01)
(Continued)

(52) U.S. Cl.
CPC ...... *G06F 16/24522* (2019.01); *G06F 16/248* (2019.01); *G06F 16/2455* (2019.01);
(Continued)

(58) Field of Classification Search
CPC ............. G06F 16/3329; G06F 16/3338; G06F 16/3344
See application file for complete search history.

(56) References Cited

U.S. PATENT DOCUMENTS 6,609,122 B1 8/2003 Ensor
7,028,301 B2 4/2006 Ding
(Continued)

FOREIGN PATENT DOCUMENTS

EP 0709788 A1 5/1996

OTHER PUBLICATIONS

Context-Free Grammars, 6 pages.
(Continued)

*Primary Examiner* — Loc Tran
(74) *Attorney, Agent, or Firm* — Fletcher Yoder PC

(57) ABSTRACT

An example embodiment may involve a software application executable on a computing device of a computational instance of a remote network management platform associated with a managed network. The computational instance may contain a database from which information associated with the managed network can be delivered to the client device. The software application may receive, from a client device of the managed network, a natural language query, parse the query using context-free grammar rules in Backus-Naur form (BNF), generate a search sentence based on the parsed query, search the database using the search sentence as a search query, and transmit, to the client device, a result of the search query. The context-free grammar rules may include an extended context-free grammar rule that defines a non-terminal symbol and comprises a Boolean NOT operator that eliminates one or more potential definitions of the non-terminal symbol from consideration when parsing the query.

17 Claims, 11 Drawing Sheets

(51) Int. Cl.
  *G06F 16/2455* (2019.01)
  *G06F 16/248* (2019.01)
  *G06F 40/253* (2020.01)
  *G06F 40/205* (2020.01)
  *H04L 12/24* (2006.01)
  *H04L 29/08* (2006.01)

(52) U.S. Cl.
  CPC .......... *G06F 40/205* (2020.01); *G06F 40/253* (2020.01); *H04L 41/20* (2013.01); *H04L 67/10* (2013.01)

(56) References Cited

U.S. PATENT DOCUMENTS

| | | | |
|---|---|---|---|
| 7,062,683 B2 | 6/2006 | Warpenburg | |
| 7,131,037 B1 | 10/2006 | LeFaive | |
| 7,170,864 B2 | 1/2007 | Matharu | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 10,044,566 B1 | 8/2018 | Grisco et al. | |
| 2005/0262210 A1 | 11/2005 | Yu | |
| 2008/0010259 A1 | 1/2008 | Feng et al. | |
| 2010/0169234 A1* | 7/2010 | Metzger | H04W 4/24 705/348 |
| 2013/0024440 A1* | 1/2013 | Dimassimo | G06F 16/3344 707/709 |
| 2014/0379753 A1 | 12/2014 | Roit et al. | |
| 2018/0060297 A1 | 3/2018 | Wegryn et al. | |

OTHER PUBLICATIONS

Regular Expressions (Regex) Tutorial, Nov. 2018, 11 pages.
Office Action for Canadian Patent Application No. 3,055,973, dated Jun. 22, 2021; 6 pgs.
Australian Examination Report for Australian Patent Application No. 2019232926 dated Oct. 28, 2020; 6 pgs.
Aliaksei Vertsel et al.; "Pragmatic approach to structured data querying via natural language interface", https://arxiv.org/abs/1807.00791 (9 pgs).
Extended European Search Report for European Application No. 19198550.6 dated Jan. 21, 2020, 11 pgs.

* cited by examiner

PARSING OF USER QUERIES IN A REMOTE NETWORK MANAGEMENT PLATFORM USING EXTENDED CONTEXT-FREE GRAMMAR RULES

CROSS-REFERENCE TO RELATED APPLICATION

The present application claims priority to U.S. Provisional Application No. 62/734,916, filed on Sep. 21, 2018 and U.S. Provisional Application No. 62/741,935, filed on Oct. 5, 2018, the entire contents of which are herein incorporated by reference.

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through computational instances of the remote network management platform.

Many services and interfaces that a remote network management platform provides can be database-driven. That is, such services and interfaces can involve the remote network management platform retrieving data for users, often in response to user queries. Thus, the efficiency in which the remote network management platform retrieves and otherwise manages its data can impact the effectiveness of such services and interfaces.

SUMMARY

In managed networks, particularly large-scale managed networks with hundreds or thousands of users and computing devices and thus large amounts of data (e.g., terabytes), databases are frequently searched by a variety of users to obtain desired data. For example, there can be hundreds or thousands of searches per day across the managed network. Furthermore, the type of data searched, the amount of data searched, the manner in which the data is organized and stored, and the manner in which users attempt to search for data can change over time and can also vary per user, per department, per application or service being used for searching, or vary in another manner across the managed network.

As data searches within the managed network increase and/or otherwise change in complexity or frequency, it can be difficult for the remote network management platform to provide services that efficiently and consistently parse user queries and obtain desired results. To address these and other issues, the methods and systems described herein provide a remote network management platform that is configured to provide improvements to user query parsing.

Accordingly, a first example embodiment may involve a method performed by a software application executable on a computing device of a computational instance. The method may involve receiving, from a client device of a managed network, a natural language query, where a remote network management platform is associated with the managed network and contains the computational instance, and where the computational instance contains a database from which information associated with the managed network can be delivered to the client device. The method may also involve parsing the natural language query using a plurality of context-free grammar rules in Backus-Naur form (BNF), where the plurality of context-free grammar rules includes a set of extended context-free grammar rules, where a first extended context-free grammar rule of the set defines a non-terminal symbol and comprises a Boolean NOT operator that eliminates one or more potential definitions of the non-terminal symbol from consideration when parsing the natural language query. The method may also involve generating a search sentence based on the natural language query as parsed, searching the database using the search sentence as a search query, and transmitting, to the client device, a result of the search query.

A second example embodiment may involve a method performed by a software application executable on a computing device of a computational instance. The method may involve receiving, from a client device of a managed network, a natural language query, where a remote network management platform is associated with the managed network and contains the computational instance, and where the computational instance contains a database from which information associated with the managed network can be delivered to the client device. The method may also involve determining that a first term of the natural language query does not match any term in a list of predetermined terms. The method may also involve, after determining that the first term of the natural language query does not match any term in the list of predetermined terms, revising the natural language query by (i) applying a set of linguistic rules that modify the first term to generate a replacement term, (ii) determining whether the replacement term matches at least one term in the list of predetermined terms, and (iii) after determining that the replacement term matches at least one term in the list of predetermined terms, replacing the first term in the natural language query with the replacement term. The method may also involve parsing the natural language query as revised, generating a search sentence based on the parsing, searching the database using the search sentence as a search query, and transmitting, to the client device, a result of the search query In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
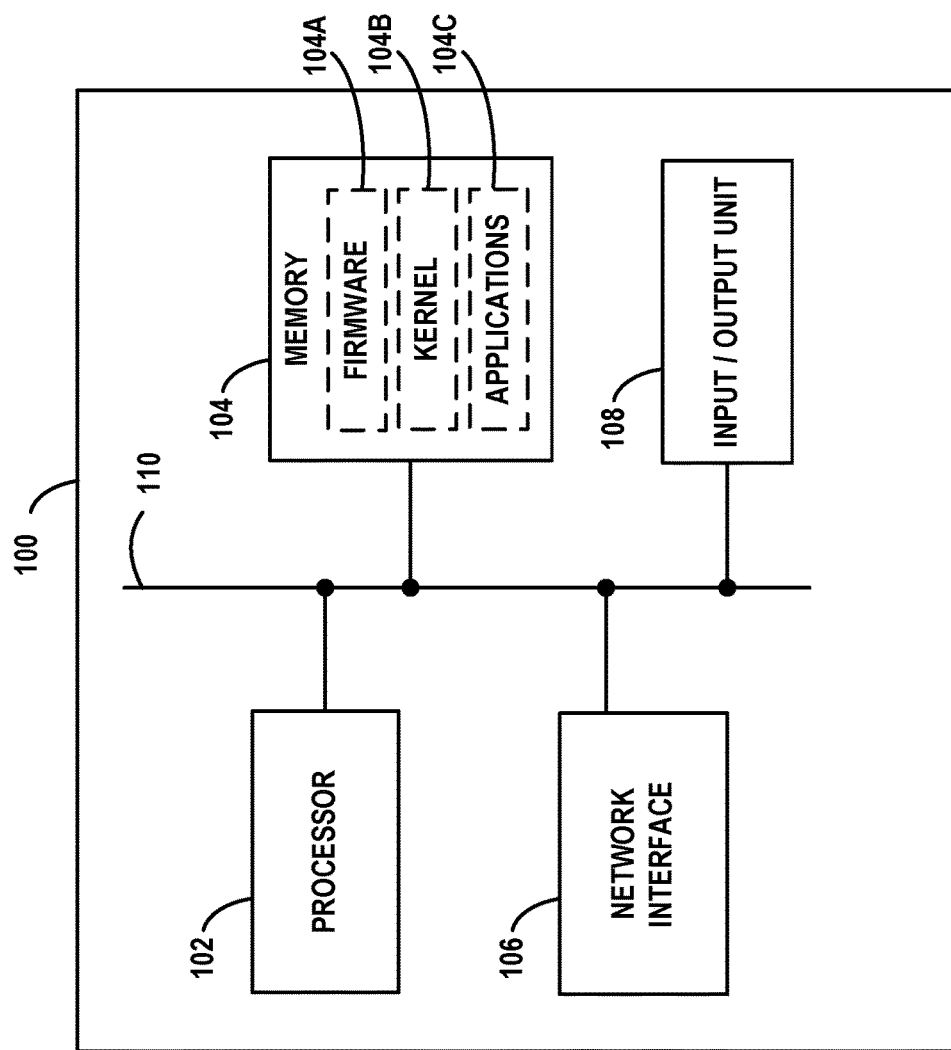
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
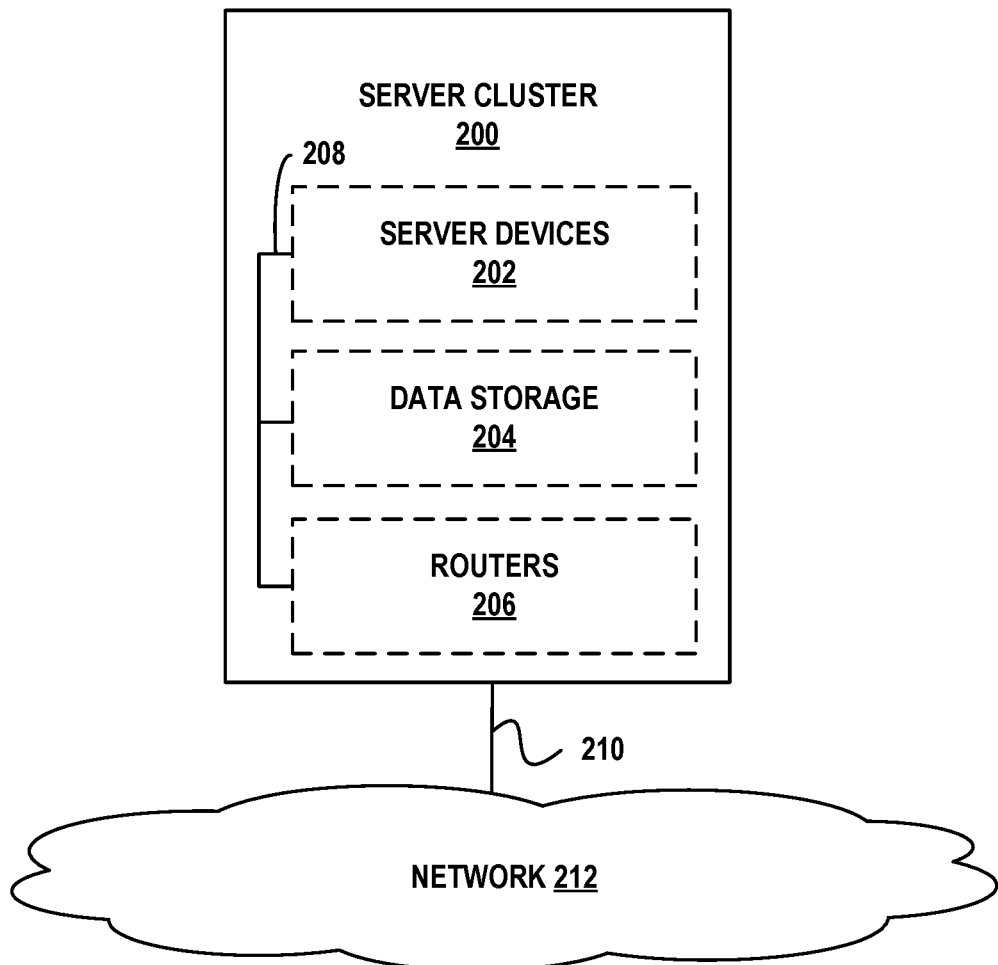
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
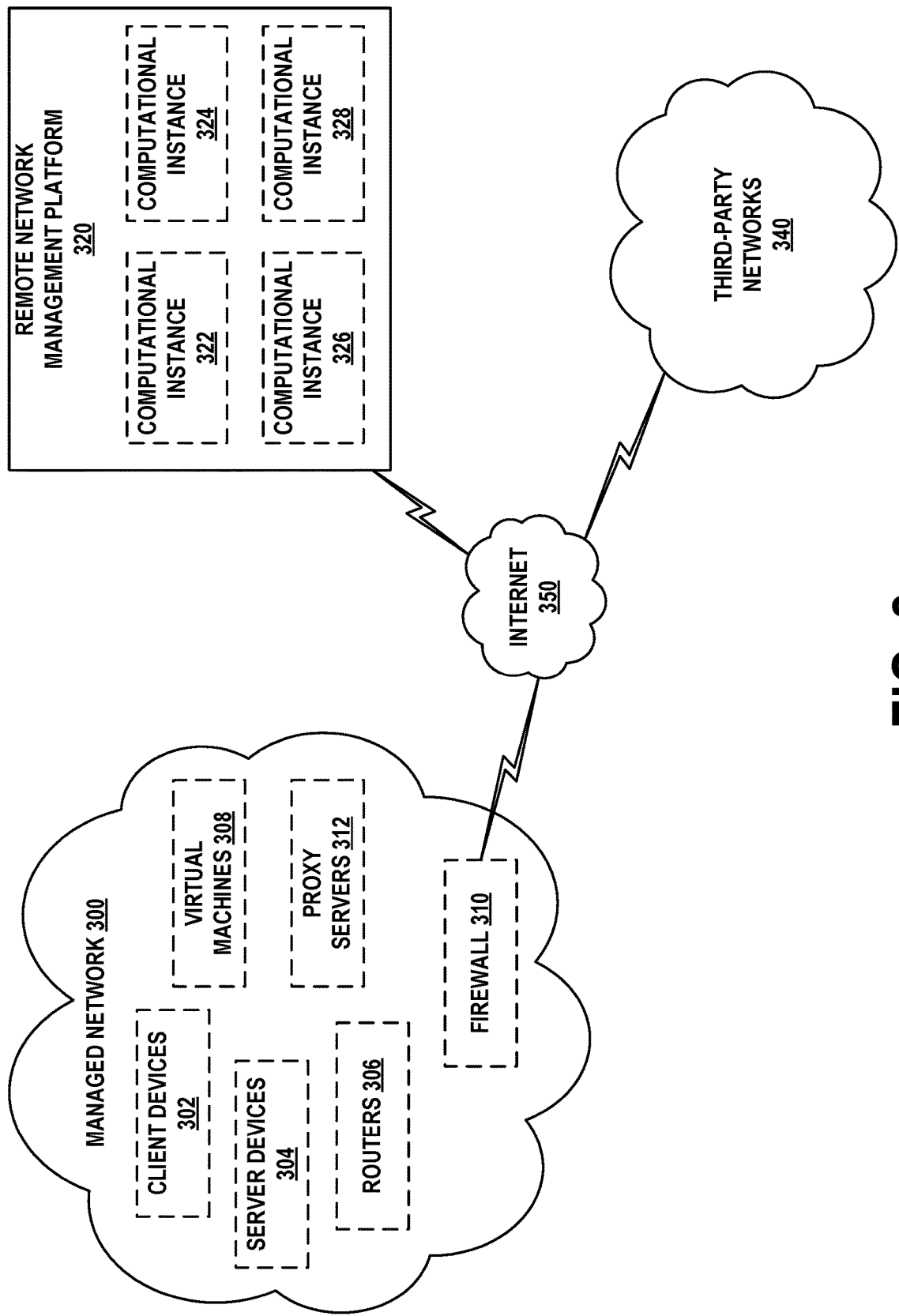
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
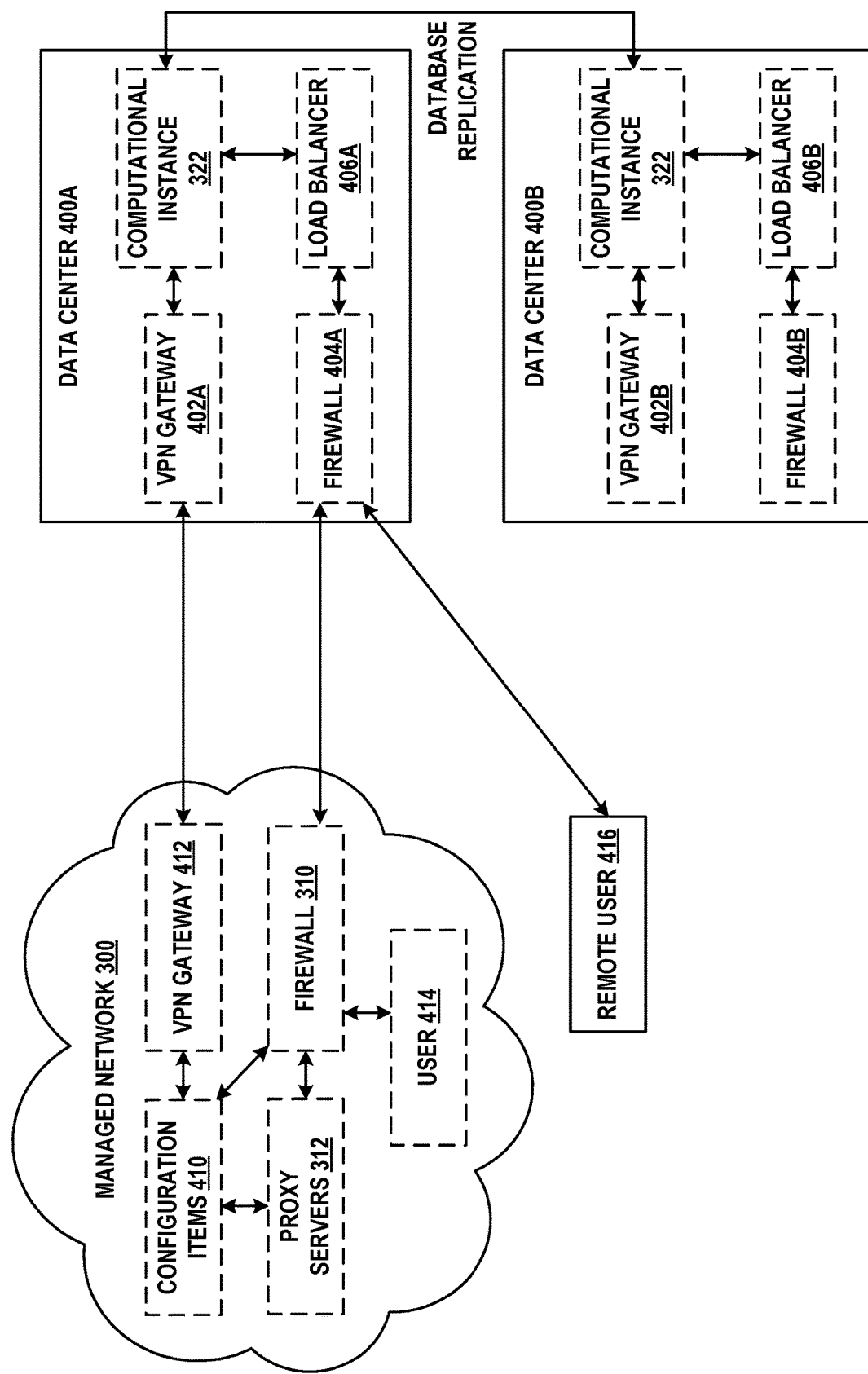
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
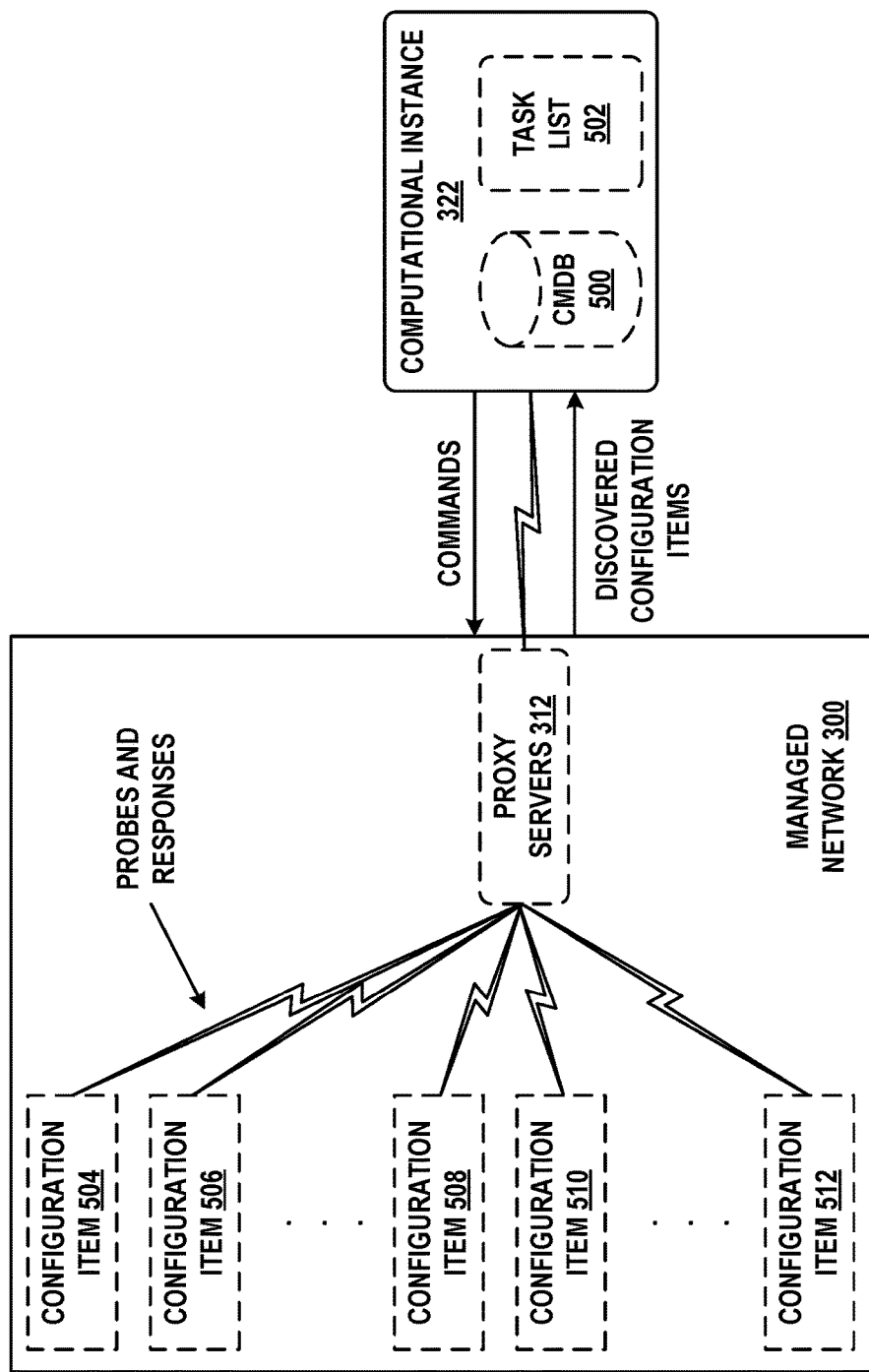
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
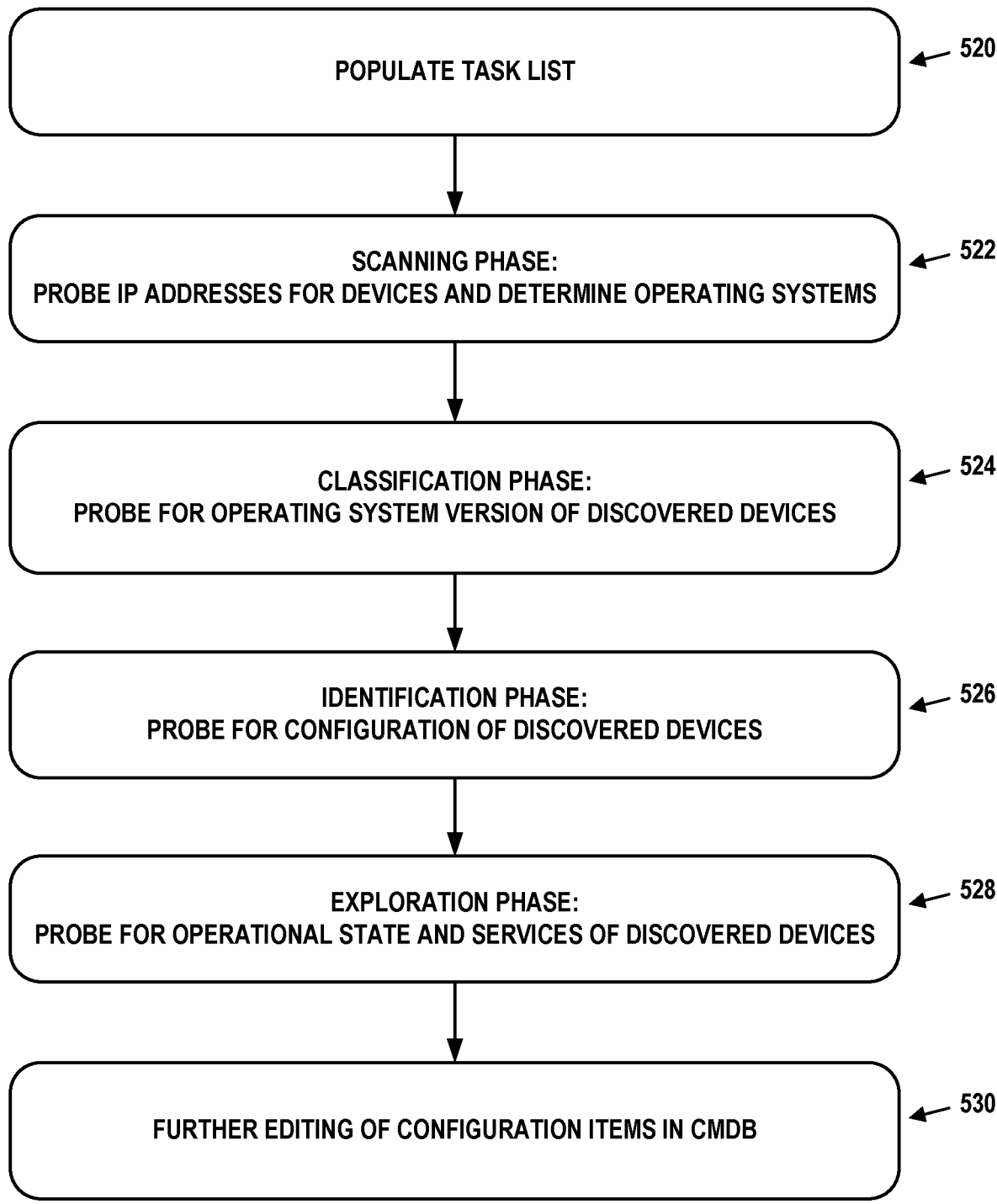
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE GRAMMARS AND QUERY PARSING

Examples related to query parsing will be described herein primarily in the context of a managed network and a remote network management platform, such as managed network 300 and remote network management platform 320. However, these examples can also be applied at a more general level outside of this particular context, such as user queries made with an Internet search engine.

It can be desirable for a remote network management platform to provide an efficient, consistent, and secure means for storing, retrieving, and otherwise managing data, particularly large-scale enterprises with hundreds or thousands of users and computing devices and thus large amounts of data (e.g., terabytes) that need to be managed. Efficient, consistent, and secure data management can affect the efficiency, consistency, and overall quality of the services, interfaces, and other functions that the remote network management platform provides.

One aspect of data management is the ability to efficiently retrieve data requested by a user in a query, particularly when there is a large amount of data through which to search for the specific information that the user seeks. At a high level, for example, this can involve a computing device receiving a text query from a user, processing the query, and using the processed query to retrieve data from one or more databases and provide the data as a search result for the user. However, for various reasons, including those described below in this section, some manners of processing user queries, and thus retrieving data that the user desires, can be challenging, time consuming, or otherwise inefficient.

One manner of processing user queries involves the concept of keyword searching. In systems that support keyword searching, a keyword-based query is received from a user and searched in one or more index databases. Keyword-based search engines interpret the user query by focusing only on identifiable keywords. Because of this, the keyword-based search engines can produce unsatisfactory search results, often returning irrelevant data. Further, in some cases, excessive amounts of data (e.g., millions of documents) are retrieved in response to a simple keyword query, which often makes it difficult for a user to find the needed information. The undesirable performance of keyword-based search engines can at times be attributable to it being difficult for keywords to capture and understand complex search semantics that a user seeks to express in the query. Rather, keyword-based search engines can often interpret the user query without ascribing any content to the form and expression entered by the user.

To address this problem with keyword searching, some search engines can utilize techniques beyond keywords. For example, such search engines can capture and understand more complex search semantics the user seeks to express. To that end, these search engines can attempt to characterize the user's query in terms of predefined frequently asked questions (FAQs), which can be manually indexed from user logs along with corresponding answers. One key characteristic of FAQ searches is that they take advantage of the fact that commonly asked questions are much fewer than total number of questions. By referencing logs of questions that were previously asked by users, FAQ-based search engines can compute which questions are most commonly asked. Further, with FAQ-based search engines, a level of indirection is added by asking the user to confirm one or more rephrased questions in order to find an answer.

Unfortunately, however, FAQ-based search engines can also be limited in their understanding the user's query because the FAQ-based search engines might only look up frequently occurring words in the query, and might not perform any deeper syntactic or semantic analysis. While FAQ-based search engines have improved search precision, there may still remain a need for further improvement in processing user queries.

One way of defining natural language words within a user query so that the query's words are more meaningful and capturing the relationship between the natural language words and phrases within the query can be to use a parser to parse the query. For example, the parser can determine the structure of the query, determine relationships between words, phrases, and/or characters in the query, and build a representation of the syntax of the query that a computing device can understand. To facilitate this, a parser can apply context-free grammars to the query. Some such grammars can be written using Backus normal form (BNF) (also known as Backus-Naur form), which is a notation technique (also referred to as a "metalanguage") that can be used to formally define the grammars so that it is ideally unambiguous during parsing of the query as to which portions of the query should undergo further processing and which portions of the user query should be rejected, ignored, etc. Such grammars will be referred to herein as BNF grammars.

A BNF grammar can be made up of a set of grammar rules (also referred to as "rules," for short, or "productions"). Rules can be written in accordance with a particular meta-syntax, which describes the allowable structure and composition of phrases and sentences written in BNF. The meta-syntax for BNF can include "terminal symbols" (or "terminals," for short) and "non-terminal symbols" (or "non-terminals," for short). Terminals can include characters, strings, and/or digits that are non-ambiguously defined and to which no rules are applied. Non-terminals, on the other hand, are more like variables in the sense that a given non-terminal is defined in terms of terminals, the non-terminal itself (e.g., in recursive situations), and/or other non-terminals. In other words, for a rule that provides a definition for a non-terminal, other rules must be sought in order to determine what the non-terminal is.

As such, each BNF grammar rule can have a left-hand side and a right-hand side. The left-hand side can include a non-terminal. The right-hand side can be an expression that provides the non-terminal's definition in terms of terminals, the non-terminal itself, and/or other non-terminals.

Consider, for example, an example BNF grammar, made up of the following two rules:

INTEGER::=DIGIT|INTEGER DIGIT
DIGIT::=0|1|2|3|4|5|6|7|8|9

In this and other examples herein, non-terminals will be denoted either by being written in all capital letters or surrounded by angled brackets, the definitional operator "::=" will be used to separate a non-terminal from the non-terminal's definition, and the operator "|" (which provides a logical OR) will be used in definitions where appropriate. It should be understood, however, that rules can be written in other manners as well. For example, non-terminals could appear in bold text, and the definitional operator ":" could be used instead of "::=".

Here is an example of how the two rules noted above can be expressed in plain English when read left to right:

An INTEGER is comprised of (or "defined as") a DIGIT, or an INTEGER and (or "followed by") a DIGIT.
A DIGIT is comprised of a 0, 1, 2, 3, 4, 5, 6, 7, 8, or 9.

Figure 6A:
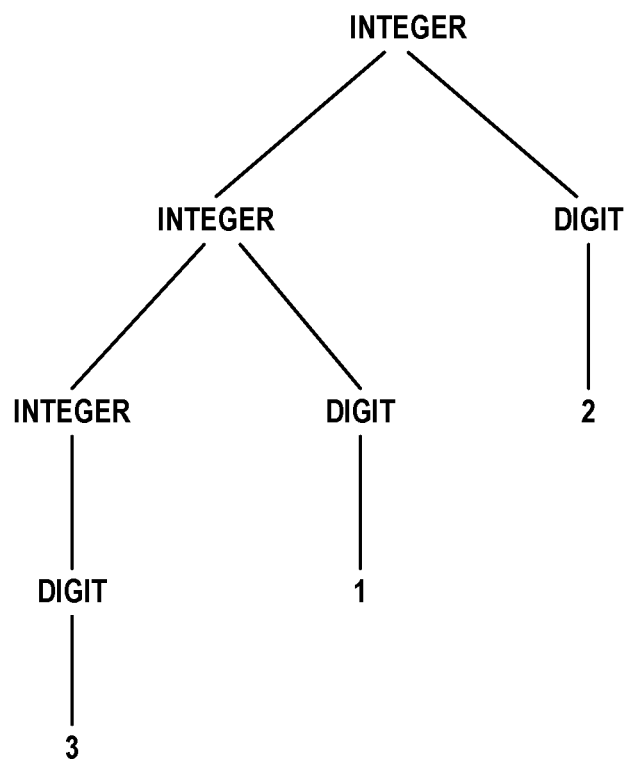
FIG. 6A is a parse tree produced using a BNF grammar, in accordance with example embodiments.

Using this BNF grammar, consider a situation in which the string, 312, appeared in a query. The parser may determine which rule(s) to apply to the string, and in doing so, can attempt to determine whether 312 is a DIGIT or an INTEGER and a DIGIT. Because 312 is not a DIGIT, it might be an INTEGER followed by a DIGIT, in which case the INTEGER is 31 and the DIGIT is 2. Further, because 31 is not a DIGIT, it too might be an INTEGER followed by a DIGIT, in which case the INTEGER is 3 and the DIGIT is 1. Finally, the INTEGER, 3, is a DIGIT. The preceding parsing of the string, 312, thus produces the parse tree illustrated in FIG. 6A. Once this information is obtained, the information can then be passed to another routine or computing device for further processing.

Figure 6B:
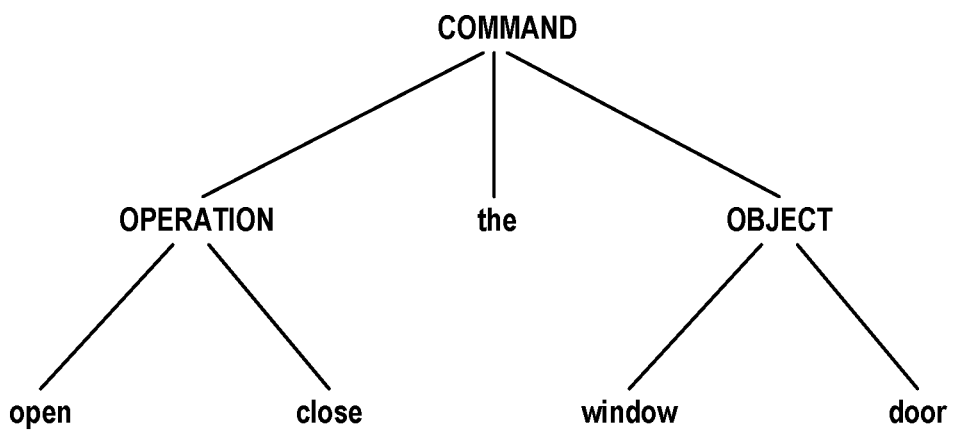
FIG. 6B is a parse tree produced using a BNF grammar, in accordance with example embodiments.

FIG. 6B is another example parse tree produced in accordance with the following example BNF grammar:

COMMAND::=OPERATION the OBJECT
OPERATION::=open|close
OBJECT::=window|door

In this example, the rules contain definitions for three non-terminals, namely, OBJECT, OPERATION, and COMMAND. According to this BNF grammar, there are two possible objects ("window" and "door"), two possible operations ("open" and "close"), and thus four possible commands ("open the window", "close the door", "open the door", and "close the window"). Therefore, when a computing device receives the phrase, "open the window," in a query, the computing device can interpret the word "open" to be an OPERATION and can interpret the word "window" to be an OBJECT. The phrase then becomes "OPERATION the OBJECT", which the rules define as a COMMAND. Thus, using the BNF grammar, the computing device can determine that the phrase "open the window" is a COMMAND, where the OPERATION="open" and the OBJECT="window." Once this information is obtained, the information can then be passed to another routine or computing device for further processing. Other example BNF grammars and parse trees are possible as well.

Unfortunately, the are some disadvantages of using BNF grammars to parse queries. While BNF grammars can provide translations for user queries that are meaningful and reflect the relationships between the elements of such queries, BNF grammars might not provide mechanisms for enhancements, such as the addition of new BNF grammars. Additionally, BNF grammars might use a dictionary or library to define terms and grammars. While the BNF grammar itself might not change frequently, the terms and synonyms that originate from the outside of a BNF grammar dictionary or library of words and phrases can change over time. For example, grammar words, phrases, or rules can change based on new user data, query logs, and the like. In these and other scenarios, however, the BNF grammars might not provide a mechanism to update and change the words, phrases, and grammars without an administrator having to structurally modify the BNF definition itself—namely, a modification to the BNF grammars or library of the BNF.

Regardless of which type of formal grammars are used when parsing a query, a structure of a sentence in a query can affect how the parser interprets the relationship between words in the sentence. For example, with sentences having a simple structure, such as "The dog likes treats," traditional algorithms can correctly interpret the relationship between the words because there are not multiple combinations of words to parse. However, with more complex sentence structures, traditional algorithms can provide multiple combinations of words, thus making it more difficult to determine the most likely combination.

When there are multiple combinations to choose, a "penalty-based" population technique can be used to narrow down the multiple combinations to fewer combinations. The "penalty-based" population technique can analyze a sentence from left to right based on a set of rules that define words and phrases in a particular order. For example, a user may input the sentence "this is a simple test". The parser may then apply the following BNF grammar to the sentence:

QUERY::=LEFT MIDDLE RIGHT
LEFT::=this|this is
MIDDLE::=is a|a simple
RIGHT::=simple test|test Using this BNF grammar, there are numerous ways to break down the sentence. For example, the sentence can be interpreted as "this" "is a" "simple test" or it can be interpreted as "this is" "a simple" "test".

To narrow down the combinations to a combination that is most likely the proper interpretation of the sentence, the parser may calculate a set of penalties. For example, the LEFT, MIDDLE, and RIGHT definitions have penalties associated with them. Each penalty is associated with the index of the OR clause firing for each of the LEFT, MIDDLE, and RIGHT definitions, wherein the first OR clause carries a penalty of zero, the second OR clause carries a penalty of one, etc.

Referring back to the "this is a simple test" example, the parse of LEFT="this", MIDDLE="is a", RIGHT="simple test", is a solution with a penalty of zero. Each word or phrase of the parse (i.e. "this", "is a", "simple test") is part of the first OR clause in the rules. In contrast, the parse of LEFT="this is", MIDDLE="a simple", RIGHT="test" would have a penalty score of 3 because "this is" is a second OR clause with a penalty of 1, "a simple" is a second OR clause with a penalty of 1, and "test" is a second OR clause with the penalty of 1 (i.e., 1+1+1=3). Thus, the parse having the penalty of zero would be chosen as the most likely proper interpretation of the sentence.

However, a penalty of zero might not always be possible. For example, suppose the parser applies the following BNF grammar to the sentence "this is a simple test":

QUERY::=LEFT MIDDLE RIGHT
LEFT::=this is|this
MIDDLE::=is a|a simple
RIGHT::=simple test|test In this example, a penalty of zero is not possible with the parse of LEFT="this is", MIDDLE="is a", RIGHT="simple test", because the sentence is not "this is is a simple test". Instead, the combination with the lowest penalty would be LEFT="this", MIDDLE="is a", RIGHT="simple test" with the penalty of 1. Thus, in these and other examples where there are numerous manners in which to interpret a query, penalties might not be as sufficient as desired for ascertaining the intended interpretation of the query.

VI. EXAMPLE IMPROVEMENTS TO USER QUERY PARSING

In a network managed by a remote network management platform, particularly large-scale managed networks with hundreds or thousands of users and computing devices and thus large amounts of data (e.g., terabytes), databases are frequently searched by a variety of users to obtain desired data. For example, there may be hundreds or thousands of searches per day across the managed network. In addition, the type of data searched, the amount of data searched, the manner in which the data is organized and stored, and the manner in which users attempt to search for data can vary per user, per department, per application or service being used for searching, or otherwise vary across the managed network and can also change over time. For example, users in an IT department of the enterprise might perform complex searches in attempting to resolve incident requests submitted for other users. As another example, software asset management administrators might perform complex searches in attempting to gather and concisely organize license information so that accurate determinations of compliance can be made. Other examples are possible as well.

As data searches within the managed network increase and/or otherwise change in complexity or frequency, it can be difficult for the remote network management platform to provide services that efficiently and consistently parse user queries and obtain desired results.

Accordingly, disclosed herein is a remote network management platform that provides improvements to user query parsing. In particular, a software application executable on a computing device of a computational instance of the remote network management platform can be configured to implement improved, extended BNF grammar rules that more efficiently represent natural languages and allow BNF grammar words, phrases, and rules to be added seamlessly without having to structurally modify the BNF itself. Furthermore, in accordance with the present disclosure, the software application can additionally or alternatively be configured to efficiently correct linguistic errors in user queries and/or provide query suggestions to the user, so that user queries can be more accurately parsed (using the improved extended BNF rules or another type of grammar or parsing technique).

Figure 7:
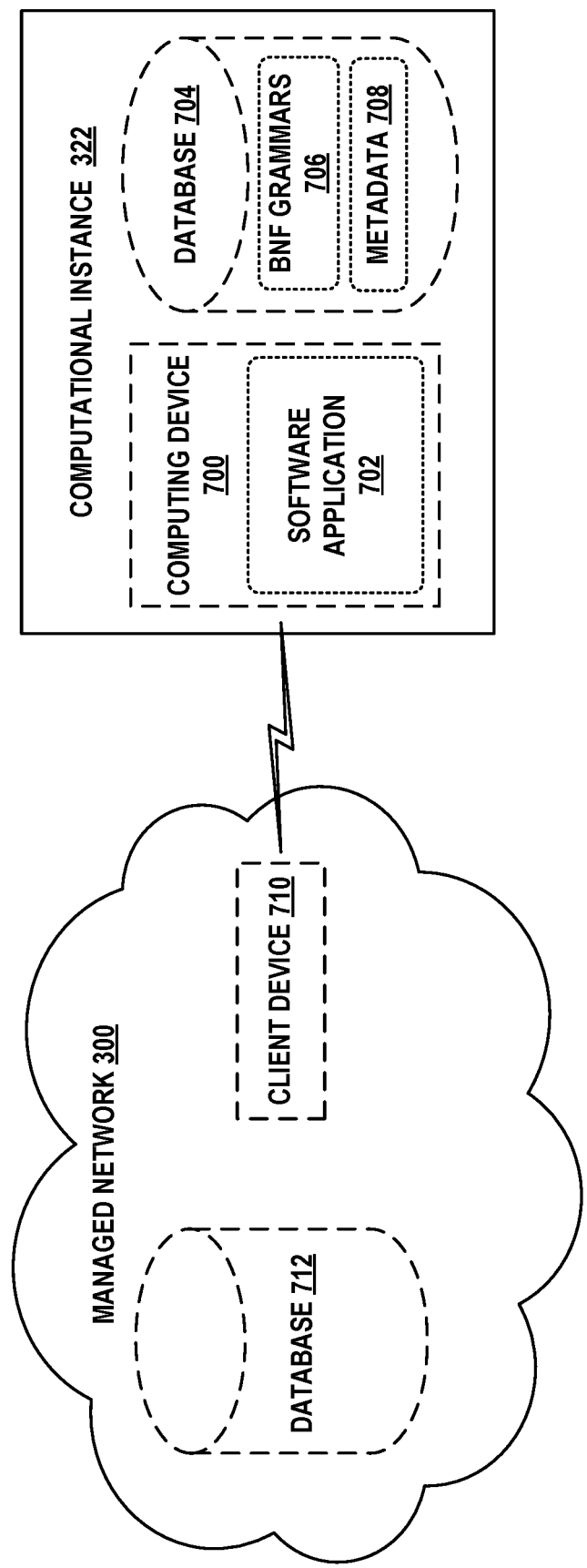
FIG. 7 depicts a communication environment in which a software application can receive and process natural language queries, in accordance with example embodiments.

FIG. 7 depicts an example communication environment in which a software application can receive and process natural language queries (also referred to herein as "user queries" or "queries," for short) in order to provide search results to client devices of managed network 300. As shown, computational instance 322 (of remote network management platform 320) can include a computing device 700 on which software application 702 is executable. Software application 702 can include one or more parsing modules (hereinafter referred to as "parsers") configured to parse queries using BNF grammars or other types of grammars.

Computational instance 322 can also include a database 704, which can store BNF grammars 706 (including improved extensions thereof) and metadata 708. Database 704 can be a local database of computing device 700 or a database contained at a different computing device of computational instance 322.

BNF grammars 706 can include at least one set of rules, some of which might correspond to a distinct human language and/or a distinct country. BNF grammars 706 can be downloaded and updated over the Internet or entered and updated by an administrator or other user of managed network 300 or remote network management platform 320.

As will be discussed in more detail below, metadata 708 can include metadata that is associated with an entity (e.g., an enterprise) that manages or is otherwise associated with managed network 300. Metadata 708 can be in various forms, such as XML, HTML, or JavaScript Object Notation (JSON). As will also be discussed in more detail below, software application 702, or a parser thereof, can include a module configured to load, examine, and utilize metadata 708 that is in XML, HTML, JSON, and/or one or more other forms.

Database 704 can be CMDB 500 or a separate database. Database 704 can also store a variety of other searchable data associated with managed network 300, such as incident reports, financial data, and identifiers of users of managed network 300, among many other possibilities.

As further shown, computing device 700 can be in communication with a representative client device 710 of managed network 300. Managed network 300 can also include its own database 712, which can store the same metadata 708 as database 704, or a portion thereof. Like database 704, database 712 can also store a variety of other searchable data associated with managed network 300, such as incident reports, financial data, and identifiers of users of managed network 300, among many other possibilities.

Using client device 710, a user can access software application 702, which can provide client device 710 with a user interface that enables the user to enter a natural language query, transmit the query to computing device 700, receive search results associated with the query from computing device 700, and view the search results.

When a user inputs a query or a portion thereof via client device 710, client device 710 can transmit the query to computing device 700, which can trigger computing device 700 to perform various actions. As an example, such actions can include, for example, (i) retrieving BNF grammars 706 to be used in parsing the query, (ii) parsing the query by applying BNF grammars 706 to the query, (iii) generating a search sentence based on the parsing, where the search sentence is in a form associated with a specific search format for a particular database, databases, or the Internet, such as SQL or XML, (iv) searching database 704, database 712, another database, or the Internet using the search sentence as a search query (the search query being a different query than the aforementioned "query"/"user query"), and (v) transmitting, to client device 710, a result of the search query.

In line with the BNF grammar examples described above, by applying BNF grammars 706 to the query, computing device 700 can parse the query into a parsing tree that can have one or more paths, each path corresponding to a respectively different interpretation of the query that can be used to generate a respective search sentence to be used to perform the search.

In some implementations, to efficiently identify which path is most likely the intended interpretation of the query, computing device 700 can apply a "left-to-right greedy matching" technique. As an example of how this technique is performed, consider again the following example BNF grammar.

QUERY::=LEFT MIDDLE RIGHT
LEFT::=this|this is
MIDDLE::=is a|a simple
RIGHT::=simple test|test In this example, the rules for non-terminals LEFT, MIDDLE, and RIGHT each have two definitions. For example, LEFT has a definition of "this is" or "this," MIDDLE has a definition of "is a" or "a simple," and RIGHT has a definition of "simple test" or "test." Thus, a first path in the parse tree can include LEFT="this is," MIDDLE="a simple," and RIGHT="test," and a second path in the parse tree can include LEFT="this," MIDDLE="is a," and RIGHT="simple test."

As a general matter, given a non-terminal having multiple different definitions in its expression, the concept of left-to-right greedy matching involves prioritizing the leftmost definition for the non-terminal. For example, for LEFT, the leftmost definition is "this," and thus, "this" would be prioritized over the next leftmost definition, "this is." Thus, "this" would be selected as the definition for LEFT over "this is," and, in turn, it follows that MIDDLE would match with "a simple" and RIGHT would match with "test." As such, the designer of this BNF grammar or a user thereof can count on this particular interpretation of the query being matched. Computing device 700 can then generate a search sentence based on this matching of the query and perform a search (e.g., of one or more of database 704 or database 712, or the Internet) using the search sentence as a search query.

As noted above, computing device 700 can be configured to implement improved, extended BNF grammar rules that more efficiently represent natural languages and allow BNF grammar words, phrases, and rules to be added seamlessly without having to structurally modify the BNF itself.

To facilitate this, BNF grammars 706 can include a set of extended BNF grammar rules that can be stored externally from the parser itself, separately from other BNF grammars, so that the set of extended BNF rules can be dynamically loaded by the parser without changing the BNF itself. In some implementations, the set of extended BNF rules can be a global set of extended BNF rules that can be downloaded or otherwise accessible to and used by various managed networks. Alternatively, the set of extended BNF rules can be specifically tailored to an entity associated with a particular managed network (e.g., managed network 300). When computing device 700 parses a received query, computing device 700 can retrieve the set of extended BNF rules (e.g., from database 704) along with, or separate from, other BNF grammars that can be used to parse the query.

In some implementations, one or more rules of the set of extended BNF rules can include a regular expression. Such rules can thus allow more seamless joining of complete words and regular expressions. For example, a rule can define a date as having the following format.

DATE_YYYY_MMDD::=\d\d\d\d[-]\d\d[-]\d\d

This example rule includes a variety of occurrences of a wildcard character, \d. A wildcard character can serve as a placeholder that can be interpreted as a number of literal characters or an empty string. In particular, in this example, \d can designate, and thus can be replaced by, any digit from 0 to 9. As such, when the query includes a date written in a 4-digit year, 2-digit month, and 2-digit day format, the wildcard characters allow the parser to correctly identify the date.

As another example, a rule can define a five and nine digits zip code as having the following format, where \d can designate a digit.

ZIP_CODE::=\d\d\d\d\d|\d\d\d\d\d[-]\d\d\d\d

In other examples, a regular expression could include other wildcard characters as well, such as \u to designate an upper-case letter, \l to designate a lower-case letter, \p to designate a punctuation mark, an underscore, _, to designate any single word, an asterisk, *, to designate any single character and/or one or more repetitions of an expression, and/or \nd to designate any number, n, of digits, among other possibilities.

As a more particular example, the following rules can define a full name as either having a first name and a last name or a first name, middle initial, and last name, where (i) a first name is of the following form: one upper case letter and either one or more lower case letters or one period "."; (ii) a middle initial is of the following form: one upper case letter and one period; and (iii) a last name is of the following form: one upper case letter and one or more lower case letters.

FULL_NAME::=FIRST_NAME LAST_NAME|FIRST_NAME MID_IN LAST_NAME
FIRST_NAME::=\u((\l)*|.)
MID_IN::=\u.
LAST_NAME::=\u(\l)*

Other wildcard characters are possible as well, as well as variations on those discussed above.

By implementing regular expressions in extended BNF rules, the parser can more efficiently parse and match certain words or other strings, such as dates, names, and zip codes, among many other examples. Without such extended BNF rules, more rules might be required to parse and match such words and/or strings. For example, regular expressions in a BNF rule to match any three-digit number followed by a lowercase letter can take the following form:

THREE_DIGITS_AND_LETTER::=\d\d\d\l

In comparison, BNF rules without regular expressions to match any three-digit number followed by a lowercase letter can take the following form:

THREE_DIGITS::=DIGIT DIGIT DIGIT LOWER_CASE
DIGIT::=0|1|2|3|4|5|6|7|8|9
LOWER_CASE::=a|b|c|d|e|f|g|h|i|j|k|l|m|n|o|p|q|r|s|t|u|v|w|x|y|z

In some implementations, one or more rules of the set of extended BNF rules can include a Boolean expression having at least one operator other than an OR operator, such as a NOT operator, an AND operator, or both a NOT operator and an OR operator.

An extended BNF rule including an AND operator can be useful, for example, in situations in which it might not be desirable for at least a portion of the query to be interpreted on a term by term basis. As an example, the parser might be configured by default to interpret the query "New York meetup" on a term by term basis, and thus might not be able to identify two different interpretations of "New York." Rather, "New York" might be interpreted as two separate terms, "New" and "York." Thus, an extended BNF rule having an AND operator can allow for seamless joining of complete words, such as "New York," when desired. Consider the following example extended BNF rules, which use an AND operator, &, as well as underscores as wildcard characters.

CITY::=san francisco|new york|seattle
ONE_TERM_CITY::=CITY & (_)
TWO_TERMS_CITY::=CITY & (_ _)

In this set of rules, the single underscore character in the parenthesis in the ONE_TERM_CITY rule can be used to match queries with one-word cities, such as Seattle. Whereas, the double underscore characters, separated by a space, in the parenthesis in the TWO_TERMS_CITY rule can be used to match queries with two-word cities, such San Francisco or New York. Other examples are possible as well.

Furthermore, an extended BNF rule including a NOT operator can be useful in certain situations, such as when words have multiple meanings. In these and other situations, the NOT operator can be used to prevent certain terms from being interpreted in ways that might be undesirable in certain contexts. For example, the word "nice" can be interpreted as a city (namely, the city of Nice, France) or as a descriptive word. Thus, for the example query, "Milan is nice," the term nice can be interpreted as the city or a descriptive word describing the city of Milan. To assist with a desired interpretation of the query, an extended BNF rule can include a NOT operator. For example, consider the following seven rules, the last of which including a NOT operator, ~.

EURO_CITY::=milan|venice|nice
US_CITY::=san|francisco|new york|seattle
VERB::=is|was
STOP WORDS::=beautiful|wonderful|EURO_AMBIGUOUS
EURO_AMBIGUOUS::=nice
US_CITY_DESCRIPTION::=US_CITY VERB STOP_WORDS
EURO_CITY_DESCRIPTION::=EURO_CITY VERB (STOP_WORDS & ~EURO_AMBIGUOUS)

In effect, the rules in this example can match the query in different ways, depending on whether the city in the query is a U.S. city or a European city. More particularly, using these rules, the parser can match queries that have the descriptive word "nice" being used to describe a U.S. city, but might not match queries that use the word "nice" to describe a European city, due to the possible confusion with the European city of Nice, France. Other examples are possible as well. By preventing the parser from interpreting terms in undesired manners, the efficiency of parsing, and thus the search as a whole, can be improved.

In some implementations, one or more rules of the set of extended BNF rules can include a metadata term that triggers computing device 700 to replace the metadata term with corresponding metadata for the entity associated with managed network 300. The corresponding metadata can come from a larger amount of metadata (hereinafter referred to as a metadata "pool") from which metadata can be matched to metadata terms in queries. The pool can take the form of one or more files, such as JSON files.

Further, the pool can be partitioned into a plurality of different subsets, each subset corresponding to a particular entity. For example, the subset of metadata associated with Entity X can include a variety of information specific to Entity X, such as a location of Entity X's headquarters, locations of other departments of Entity X (e.g., IT, accounting, HR), acronyms used internally by the departments of Entity X, and/or other terms, phrases, etc. that might be commonly used and defined by Entity X, among other possibilities. As such, the file associated with Entity X can take the form of a JSON or other type of file that defines a list of possible terms that can match to each metadata term. For example, the file can specify that the metadata term, METADATA_ENTITYX_CITY, can be replaced with San Francisco, New York, or Seattle. Additionally or alternatively, the file can specify that the metadata term, METADATA_ENTITYX_DEPARTMENT, can be replaced with HR, Accounting, IT, and Development. Other examples are possible as well.

As an example of an extended BNF rule that includes metadata terms, consider the following rule.

CONDITION::=in    METADATA_ENTITYX_CITY|at METADATA_ENTITYX_DEPARTMENT

In this example, the metadata term, METADATA_ENTITYX_CITY, can be replaced with a city that is included in the subset of metadata that is associated with Entity X. In addition, the metadata term, METADATA_ENTITYX_DEPARTMENT, can be replaced with a department of Entity X. Other examples are possible as well.

The pool can be stored in such a way that the metadata in the pool can be dynamically modified (e.g., by an administrator) without having to modify the set of extended BNF rules. The pool can be stored at database 704, database 712, in its entirety at each of database 704 and database 712, or a portion at database 704 and another portion at database 712.

To facilitate use of this/these extended BNF rule(s), computing device 700 can, at a particular point in time, load or otherwise access the pool or a relevant subset thereof, such as by querying a database at which the pool/subset is stored or downloading the pool/subset over the Internet and storing the pool/subset in a database of computing device 700 or other database that is accessible to computing device 700. In some implementations, computing device 700 can determine that the user is associated with a particular entity and responsively load the subset of the pool that corresponds to the particular entity. For example, computing device 700 can identify a search term in a user query that indicates an identity of the entity associated with managed network 300. As another example, computing device 700 can identify, from network traffic originating from client device 710, a network address of client device 710 and determine, using the network address (e.g., by looking up the network address in CMDB 500), that client device 710 is associated with managed network 300 and thus with the entity. As another example, computing device 700 can determine, from the query itself, from user profile information, and/or in other manners, an identifier of the user (e.g., a username) and determine that the identifier is associated with the entity. Other examples are possible as well. Alternatively, computing device 700 might load the entirety of the pool by default.

By utilizing metadata associated with terms in the query in the manner provided by this/these extended BNF rule(s), parsing can be tailored to a specific entity (e.g., the cities, departments, and jargon of the entity) and computing device 700 can resolve queries and retrieve data for users of that entity more efficiently, more precisely, and with less ambiguity. Further, when information about the entity changes, the subset of metadata associated with the entity can be efficiently updated without having to modify the extended BNF rule(s) that use the subset of metadata. In addition, such extended BNF rules allow a parser to accomplish this using less rules that might typically be required, which might in turn reduce the time and processing spent parsing queries. For example, to determine whether a query includes a city that is associated with a particular entity, at least one BNF rule might need to be created to specifically define a list of cities that could be associated with the entity. By using the extended BNF rule(s) described above, however, such a BNF rule might not be necessary. Furthermore, for some types of entity-specific information, it can be difficult to specify all possible definitions in a grammar, such as all possible physical addresses of buildings associated with the entity. By using the extended BNF rule(s), however, such a grammar might not be necessary, as the definitions (e.g., addresses) could be stored as metadata to be referenced and used to replace metadata terms as described above. An enterprise or other entity associated with managed network 300 can thus also advantageously configure these and other types of extended BNF rules discussed herein to uniquely tailor such rules to the desires and searchable data of that entity. Other examples are possible as well.

In some implementations, one or more of the extended BNF rules can include an at sign, @, or other character on the left side of the definitional operator, ::=, that can be used to distinguish between non-terminals that, once matched, should be included in the parse tree output from the query and non-terminals that, once matched, should not be included in the parse tree output from the query. In particular, if @ is next to the non-terminal on the left side of the definitional operator, the parser can include the non-terminal in the parse tree for the query, whereas if @ is not next to the non-terminal on the left side of the definitional operator, the parser might not include the non-terminal in the parse tree for the query.

This type of extended BNF rule can be used to ignore aspects of the query that are less desirable than others, such as a commonly-used preamble to a query that precedes a specification of the information that the user is looking for. For example, consider the following few rules applied to the query "please help me find incidents older than 10 days":

QUERY@::=PREAMBLE  DATA@  CONDITION@ AMOUNT@

PREAMBLE::=please|please provide|please help me find

Although not shown above, there can also be rules defining DATA@, CONDITION@, and AMOUNT@, and each can be included in the parse tree, along with QUERY@.

Because PREAMBLE represents a less desirable portion of the query, the non-terminal, PREAMBLE, does not include the @ sign and thus PREAMBLE, though matched, might not be included in the parse tree.

In line with the discussion above, once computing device 700 has parsed the query using the set of extended BNF rules, computing device 700 can generate a search sentence (e.g., in SQL form), search database 704, database 712, another database, or the Internet using the search sentence as a search query, and transmit a result to client device 710.

Additionally or alternatively to the operations described above with respect to extended BNF rules, computing device 700 can be configured to perform operations relating to correcting linguistic errors in user queries and/or operations related to providing query suggestions to the user, thereby improving the quality of queries that computing device 700 receives and the efficiency with which such queries are parsed.

In particular, computing device 700 can analyze the received query before parsing the query. The process for correcting linguistic errors can involve computing device 700 retrieving, from database 704, database 712, or another location, a list of predetermined terms and comparing one or more terms from the query to the list. The predetermined terms of the list can include terms that are authorized for use as replacement terms for terms of the query that might have linguistic errors in them. In this context and in others described herein, a term can refer to a single word or a phrase.

In some implementations, when computing device 700 determines that each term of the query matches a term of the list, or when computing device 700 determines that a quantity or percentage of terms of the query that match terms of the list meets or exceeds a predetermined threshold (e.g., 75% of terms match), computing device 700 can responsively proceed to parse the query. However, when computing device 700 determines that a term does not match any term in the list, this might be indicative of a linguistic error in the term, and thus, computing device 700 can responsively perform the process to correct the linguistic error. As an example, if the query is "please retrieve icnident reports from the last 30 days," there is a misspelled term, "icnident" (which should be "incident"), and the list might include the correctly-spelled version of the term, "incident." Thus, computing device 700 can determine that the term, "icnident," does not match any term in the list and proceed to correct the error. It should be understood, however, that in some situations, a particular term might not match a term of the list even if the term is a properly-spelled term. There can be other reasons for there not being a match, such as a properly-spelled term not being on the list because the term is not a commonly-used term. Other examples are possible.

After determining that a term of the query does not match any term in the list, computing device 700 can revise the query. The act of revising the query can involve (i) applying a set of linguistic rules that modify the term to generate a replacement term, (ii) determining whether the replacement term matches at least one term in the list, and (iii) after determining that the replacement term matches at least one term in the list, replacing the term in the query with the replacement term. The act of revising the query can involve other operations as well.

The set of linguistic rules can include, but is not limited to: removing a character (e.g., a letter, digit, etc.) from the term, switching two characters in the term with each other (i.e., a transposition), changing one character in the term to another character (i.e., a substitution), inserting a new character into the term, and/or adding or removing a space between two sequential characters in the term. Although examples herein are primarily described with respect to letters, it should be understood that the set of linguistic rules can be applied to numerical digits, punctuation marks, and/or other types of characters.

In some implementations, one or more linguistic rules of the set of linguistic rules can be applied more than once to the term. Each linguistic rule that is used can be applied a predetermined number of times or until a match is made between the resulting replacement term and a term on the list. In some implementations, computing device 700 can be configured to rank matched terms and select a replacement term from the matches in various ways, such as by determining the edit distance (e.g., Levenshtein distance) of each matched term and selecting one or more terms with the shortest edit distance. Other examples are possible as well.

As a representative example, consider the following application of the above-noted set of linguistic rules to the misspelled query term, "icnident." Although example predetermined numbers of times are provided, it should be understood that, for a particular linguistic rule, other predetermined numbers of times are possible. Furthermore, other linguistic rules are possible as well, additionally or alternatively to examples provided herein.

Computing device 700 can remove a letter (e.g., "indent," removing the "c") and compare the resulting replacement term to the list. For this rule, the predetermined number of times can be equal to a number of letters in the term—one removal for each letter in the term. For example, eight removals can be attempted for "icnident" because there are eight letters.

Additionally or alternatively, computing device 700 can switch two letters with each other (e.g., "incident," switching the first "n" and the "c") and compare the resulting replacement term to the list. For this rule, the predetermined number of times, N, can be defined by Equation 1, where L is a length of the term and is greater than or equal to two.

$$\text{Number of times} = (L-1) \qquad \text{Equation (1)}$$

Additionally or alternatively, computing device 700 can change one letter in the term to another letter (e.g., "innident," changing the letter "c" to another "n") and compare the resulting replacement term to the list. For this rule, the predetermined number of times can be equal to 25 multiplied by the number of letters in the term, because there are 26 letters in the alphabet and each letter in the term can be changed to 25 alternatives. However, the predetermined number of times can be higher if both uppercase and lowercase letters are taken into account, because a letter in the term could be changed to a lowercase letter or an uppercase letter.

Additionally or alternatively, computing device 700 can insert a new letter into the term (e.g., "icnidents," adding an "s") and compare the resulting replacement term to the list. For this rule, the predetermined number of times, N, can be defined by Equation 2, where L is a length of the term and is greater than or equal to two, and where NC is a number of replacement characters (e.g., 26 for lower case letters only, 52 for lowercase and uppercase letters only, and 62 for lowercase letters, uppercase letters, and digits).

$$N = 26 * (L+1) \qquad \text{Equation (2)}$$

Equation 2 can be defined as such because there are 26 letters to be tried in each position in the term, including trying to insert a letter as the first letter and as the last letter.

Additionally or alternatively, computing device 700 can insert add a space between two sequential letters in the term into the term (e.g., "icni dent") and compare the resulting replacement term to the list. For this rule, the predetermined number of times can be the number of letters in the term minus one.

Additionally or alternatively, computing device 700 can insert add a space between two sequential letters in the term into the term (e.g., "icni dent") and compare the resulting replacement term to the list. For this rule, the predetermined number of times can be the number of letters in the term minus one.

Additionally or alternatively, computing device 700 can remove add a space between two sequential letters in the term into the term and compare the resulting replacement term to the list. For this rule, the predetermined number of times can be the number of letters in the term minus one. However, because the term "icnident" is only one word, and not two or more words having spaces between them (e.g., "New York"), such a rule might not be applied in this situation.

The above-described linguistic rules can be applied in scenarios where exact matching between query terms and the list is desired before proceeding to parse the query. Additionally or alternatively, approximate matching can be used. To facilitate this, the set of linguistic rules can include a set of fuzzy matching rules for performing approximate matching.

Herein, the concept of "fuzzy matching" refers to a technique that allows for less-than-exact matches for terms with potential linguistic errors. In particular, computing device 700 can generate multiple candidate replacement terms (hereinafter alternatively referred to as "candidates," for short) for a particular term, where the candidates are weighted in a particular way. For example, computing device 700 can weigh the candidates according to probabilities, where a probability for a candidate can indicate a likelihood that the candidate is a best match for the term. For example, computing device 700 can weigh the candidates according to use scores, and so a probability for a candidate can indicate a likelihood that a candidate is the best match for the term according to use scores. Suppose that NCAN is a number of candidates that could match a term, and that each candidate, ICAN, has a corresponding use score, USE_SCORE(ICAN). Then, an approximate probability, P(C1), for a candidate, C1, of the NCAN candidates based on use scores can be defined by Equation 3 as follows.

$$P(C1) = \frac{USE\_SCORE(C1)}{\sum_{i=1}^{NCAN} USE\_SCORE(i)} \qquad \text{Equation (3)}$$

Computing device 700 can have access to a stored history of term usage in queries and can refer to the history in assigning a respective use score to each candidate and weigh the use score for a candidate based on a sum of use scores for all candidates. The history of term usage can be a history of term usage per user, per group of users, or per entity (e.g., per enterprise), among other possibilities.

In other examples, the use score for a candidate can be weighed based on a frequency at which the candidate was used in past queries. Other examples are possible as well. Computing device 700 can then select one or more of the candidates based on how the candidates are weighted, such as by selecting the candidate having the highest probability, highest use score, or some linear combination thereof (e.g., α*probability+β*use, where α and β are weights).

In some implementations, the linguistic rules of the set of linguistic rules described above can also be used as fuzzy matching rules. In other words, the operations performed in accordance with the set of linguistic rules, such as character insertions, deletions, switches, etc., can be performed when applying fuzzy matching rules. As an example, a fuzzy matching rule can include removing one or more letters from the term. Additionally or alternatively, a fuzzy matching rule of the set can include switching two or more letters in the term with each other. Additionally or alternatively, a fuzzy matching rule of the set can include changing one or more letters in the term to other letters. Additionally or alternatively, a fuzzy matching rule of the set can include inserting one or more new letters into the term. Other fuzzy matching rules are possible as well.

The number of candidates that are produced during fuzzy matching can be extensive, particularly when terms contain numerous characters and when a query contains numerous terms that might have linguistic errors. For example, if a fuzzy matching rule substitutes one letter for another in a term, a term with ten letters can result in up to two hundred and fifty candidates (i.e., twenty-five letters that could be substituted for each of the ten letters). The number of candidates can increase even more if multiple different fuzzy matching rules are applied. In these scenarios, it can take the parser longer to parse through the numerous different candidates and/or can cause the parser to spend time on potentially weaker candidates (e.g., candidates that might not closely resemble a word in the English language). For at least this reason, it can be desirable to have computing device 700 place limits on fuzzy matching.

Thus, in some implementations, computing device 700 can place one or more limits on fuzzy matching, and thus, on how many candidates computing device 700 generates or uses as replacement term(s) for revising the query. As an example, computing device 700 can be configured to limit how many candidates are generated by limiting how many character modifications (i.e., insertions, deletions, substitutions, switches, etc.) are made to a particular term in the first place. This can be accomplished in various ways. For example, a threshold can be applied per fuzzy matching rule (e.g., no more than a threshold number of candidates generated using insertions). Any two fuzzy matching rules could have the same threshold or different thresholds. Additionally or alternatively, a threshold can be applied to a group of two or more fuzzy matching rules (e.g., no more than a threshold total number of candidates generated by a combination of insertions, deletions, switches, and substitutions). In other words, computing device 700 can be configured to apply two or more fuzzy matching rules to the term such that the total number of applications made across the two or more fuzzy matching rules does not exceed a predefined threshold.

Computing device 700 can also limit fuzzy matching by selecting replacement terms only from candidates that differ from the term by less than a threshold number of modifications. For example, consider the term, "coil," where "foil," "coils," "oil," and "foal" are potential candidates from which computing device 700 can select to be a replacement term for "coil." Computing device 700 can have in place a threshold of one—meaning that any candidate that differs from "coil" by more than one modification might not be considered as a replacement term. Because "foil" differs by one substitution, "coils" differs by one insertion, "oil" differs by one deletion, and "foal" differs by two substitutions, all the candidates except "foal" can be selected using this threshold. Other examples are possible as well.

Computing device 700 can apply the above-described linguistic rules and/or fuzzy matching rules to a query at various points in time, such as before computing device 700 first attempts to parse the query, or in response to one or more failed attempts at parsing the query. Along similar lines, computing device 700 can apply the above-described linguistic rules and/or fuzzy matching rules in other situations as well, such as for providing query suggestions to the user before a final query is submitted.

In some implementations, computing device 700 can be configured to provide only a single query suggestion to the user. In other implementations, computing device 700 can provide more than one query suggestion. Generation of a query suggestion can occur in various ways. In some implementations, after receiving a portion of the query, computing device 700 can apply two or more of the fuzzy matching rules described above to generate a plurality of query suggestions. The plurality of query suggestions can then be transmitted to client device 710 for display. The user can then select one or none of the query suggestions to be the query submitted to computing device 700.

The number of query suggestions provided to the user can be limited in much the same manner as the number of candidates can be limited as described above. Along these lines, the threshold(s) that control the number of query suggestions that are provided for display can be set lower so as not to overwhelm the user with an excessive number of suggestions. Additionally or alternatively, query suggestions containing candidate terms can be included or not included in the displayed query suggestions according to a weighting assigned to the candidate terms and/or according to whether a match can be found in the list for the candidate terms.

In some implementations, computing device 700 can apply one or more extended BNF rules to interpret the portion of the query and provide one or more query suggestions. For example, if computing device 700 determines that the portion of the query contains a metadata term, computing device 700 can replace the metadata term with corresponding metadata in real-time. As a more particular example, consider a situation in which an administrator responsible for assessing software license compliance searches for "compliance records," and Entity X—an entity for which the user works and with which managed network 300 is associated—has corresponding metadata that includes a shorthand acronym for referring to such records, such as "LCR." Further, there can be BNF grammars defined for Entity X that are tailored for efficiently parsing queries that include the term "LCR" and returning relevant results. In this situation, and using extended BNF rules, computing device 700 might provide a query suggestion that replaces "compliance records" with "LCRs," so that computing device 700 might then more efficiently parse the user's query if that particular query suggestion is selected.

In line with the discussion above, rules-based query suggestions—namely, linguistic rules, fuzzy matching rules, and/or extended BNF rules—can provide advantages over other types of query suggestions such as history-based suggestions. For example, in the context of managed network 300 and remote network management platform 320, there can be a closed universe of terms that are unique to managed network 300 and remote network management platform 320 or more frequently used by users of managed network 300 and remote network management platform 320 than individuals outside of managed network 300. Thus, because metadata, extended BNF rules, and/or lists used for exact or approximate matching can be tailored to and updated for users/entities associated with managed network 300 and/or remote network management platform 320, query parsing and subsequent searching can be accomplished more efficiently and in a manner that is more partial to the nomenclature or other needs of such users/entities.

By contrast, some techniques for history-based query suggestions might take into account search terms historically present in queries from users who are not associated with managed network 300 and remote network management platform 320, which could thus bias parsing and search results in an undesirable way for users of managed network 300 and remote network management platform 320. In some implementations, however, query suggestion could be performed using a hybrid of rules and a history of past terms. For example, computing device 700 can generate a plurality of query suggestions using fuzzy matching rules and then rank the plurality of query suggestions according to how frequently terms in the query suggestions have been used in the past—either historically by users of managed network 300 or historically by users both inside and outside of managed network 300. To facilitate implementations where past queries are taken into account, such queries can be stored at a database managed by an entity associated with managed network 300, at a database of computing device 700 that is managed by an entity associated with remote network management platform 320, and/or at a database outside of managed network and managed by a third party. Computing device 700 can access the past queries from any one or more of such databases and analyze the past queries thereafter.

Figure 8:
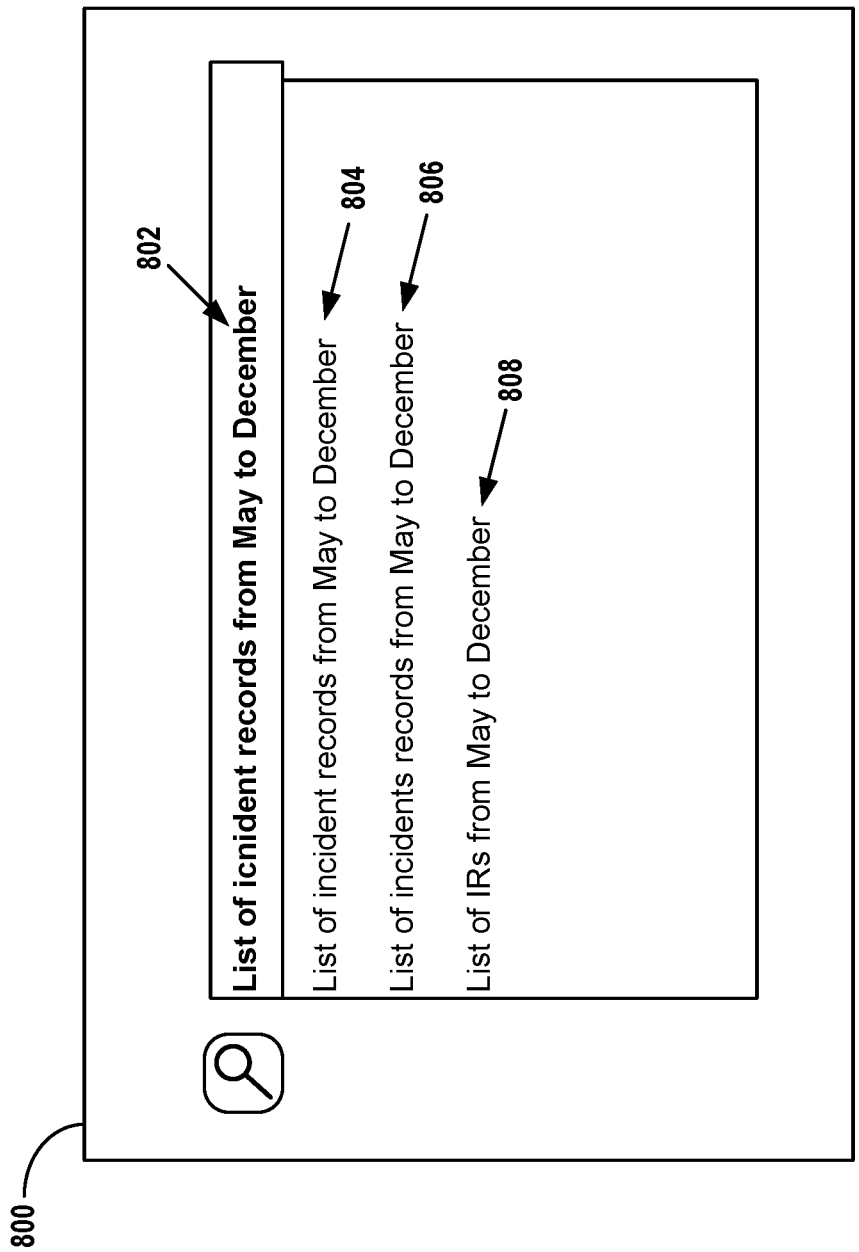
FIG. 8 depicts a graphical user interface (GUI) including a query and multiple query suggestions, in accordance with example embodiments.

FIG. 8 depicts an example GUI 800 that includes a query 802 and multiple query suggestions 804, 806, and 808 that computing device 700 can generate and provide for display at client device 710. As shown, the term "incident" in query 802 is misspelled and each of the query suggestions corresponds to a different fuzzy matching rule or extended BNF rule. In particular, query suggestion 804 switched the "n" and the "c" to complete a correct spelling of the term, query suggestion 806 switched the "n" and the "c" and added an "s," and query suggestion 808 replaced the term "icnident records" with a shorthand of "IR," which could represent a shorthand used by users within the entity with which managed network 300 is associated.

In some implementations, computing device 700 can include provisions for when a user has or has not typed a space after a last term in a query. In this situation, the first term of the suggestion depends on whether the last word the user has typed must be completed, or a new word should be started. For example, for the query, "this is a," with no space at the end can be matched as "this is a*" or "this is a **," where the asterisk is a wildcard character, where "a*" stands for a query that begins with "this is a" and has one more term after the "a," and where "a**" stands for a query that begins with "this is a" and has two more terms after the "a." As such, computing device 700 might provide "this is a test" and "this is a simple test" as query suggestions. Conversely, for the query, "this is a sim," with a space at the end, there might be no words that can be added for a grammar to accept the term "sim," and computing device 700 might thus return an empty set of query suggestions. Other examples are possible as well.

Furthermore, in some implementations, computing device 700 can provide a linguistic shortcut feature that can allow for deviations of queries to create more accurately revised queries or query suggestions based on the user's initial query. Such linguistic shortcuts can include a set of words that have a rich semantics behind them and can allow for users to express queries in a more laconic and natural way, thereby making the query translation system easier to use and more intelligent. In particular, such linguistic shortcuts can express an entire condition or sorting clause with one word. Further, such linguistic shortcuts can be defined by an administrator, determined by a machine-learning feature, or imported from other sources, and can be defined in an index. In the index, each linguistic shortcut can be associated with equivalent terms (e.g., single words or phrases).

As an example, a linguistic shortcut term can be the term, "multiple," and, in the index, "multiple" can be associated with the phrase "whose number is more than one." Thus, when a user enters a query such as "companies that work in multiple markets," computing device 700 can apply linguistic shortcut rules to replace "multiple" with "whose number is more than one," as "multiple" can be a more laconic and natural term than "whose number is more than one." Thus, computing device 700 can replace the query with "companies where number of markets is more than one" or can supplement the query with a second query of "companies where number of markets is more than one." Other examples are possible as well.

VII. EXAMPLE OPERATIONS

Figure 9:
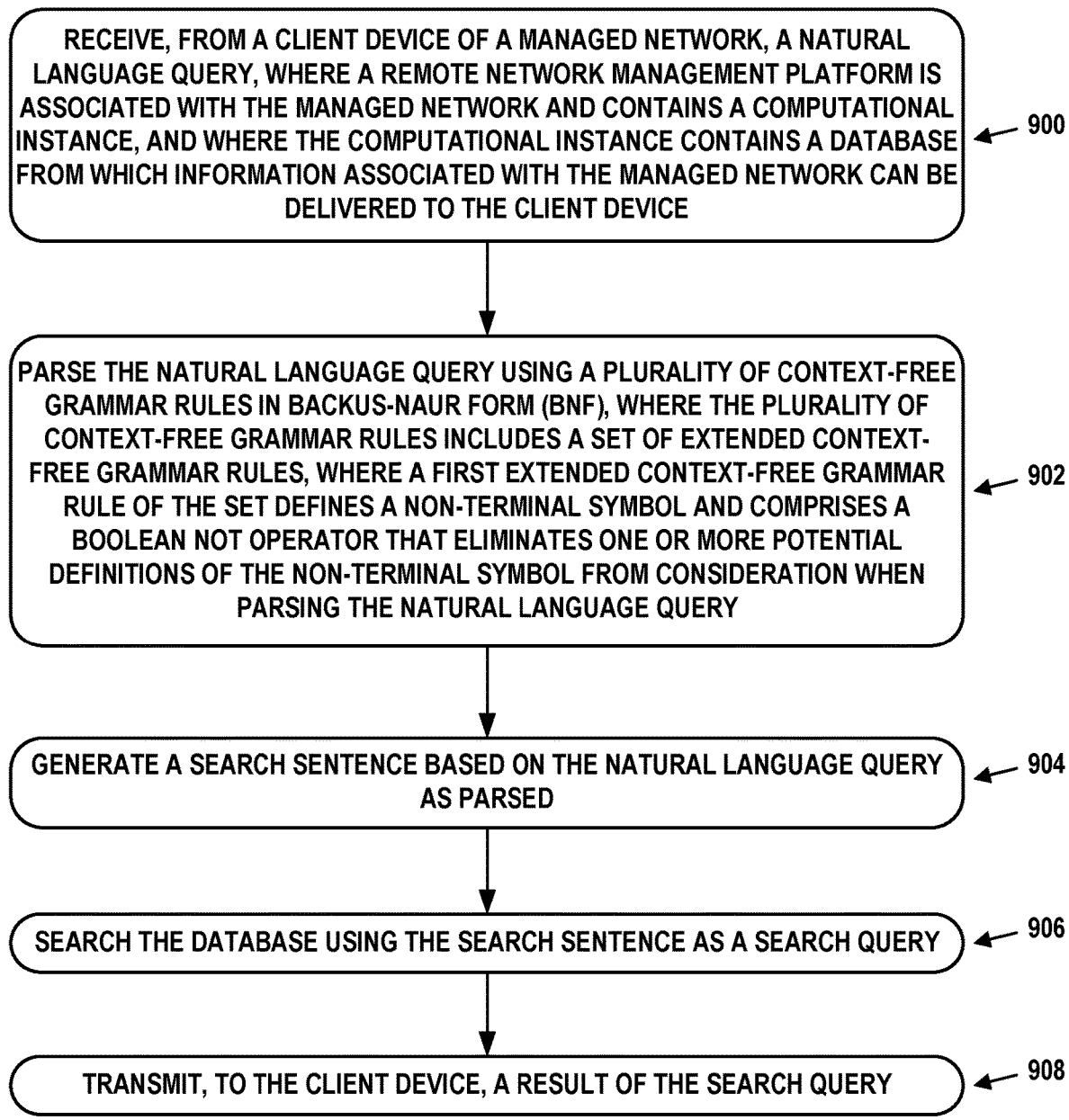
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. For the purposes of example, the process illustrated by FIG. 9 will be described as being carried out by a software application, such as software application 702, that is executable on a computing device of a computational instance of remote network management platform 320, such as computing device 700 of computational instance 322. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 involves receiving, from the client device, a natural language query.

Block 902 involves parsing the natural language query using a plurality of context-free grammar rules in BNF. The plurality of context-free grammar rules can include a set of extended context-free grammar rules. A first extended context-free grammar rule of the set can define a non-terminal symbol and comprises a Boolean NOT operator that eliminates one or more potential definitions of the non-terminal symbol from consideration when parsing the natural language query.

Block 904 involves generating a search sentence based on the natural language query as parsed.

Block 906 involves searching the database using the search sentence as a search query.

Block 908 involves transmitting, to the client device, a result of the search query.

In some embodiments, the first extended context-free grammar rule of the set can further include a Boolean AND operator that, in combination with the Boolean NOT operator, eliminates the one or more potential definitions of the non-terminal symbol from consideration when parsing the natural language query and specifies a number of terminal symbols to consider as a single terminal symbol.

In some embodiments, a second extended context-free grammar rule of the set can include a Boolean AND operator that specifies a number of terminal symbols to consider as a single terminal symbol.

In some embodiments, a second extended context-free grammar rule of the set can include a regular expression. The regular expression can include one or more wildcard characters, where each wildcard character of the one or more wildcard characters can acts as a respective placeholder for (i) one or more other characters or (ii) an empty string.

In some embodiments, a second extended context-free grammar rule of the set can include a metadata term that triggers the computing device to replace the metadata term with corresponding metadata. The corresponding metadata can be a term selected from a list of terms that are each mapped to respective metadata terms and each relate to an entity that is associated with the managed network. In such embodiments, the corresponding metadata can be stored at one or more of the database or a second database contained within the managed network, and the act of replacing the metadata term with the corresponding metadata can involve retrieving the corresponding metadata from one or more of the database or the second database and then replacing the metadata term with the corresponding metadata.

In some embodiments, the process illustrated by FIG. 9 can also involve determining that a first term of the natural language query does not match any term in a list of predetermined terms and, after determining that the first term of the natural language query does not match any term in the list of predetermined terms, revising the natural language query. The natural language query can be revised by (i) applying a set of linguistic rules that modify the first term to generate a replacement term, (ii) determining whether the replacement term matches at least one term in the list of predetermined terms, and (iii) after determining that the replacement term matches at least one term in the list of predetermined terms, replacing the first term in the natural language query with the replacement term. In such embodiments, the act of parsing the natural language query using the plurality of context-free grammar rules in BNF can involve parsing the natural language query as revised using the plurality of context-free grammar rules in BNF.

The set of linguistic rules can include one or more of (i) removing a character from the first term, (ii) switching two characters in the first term with each other, (iii) changing one character in the first term to another character, (iv) inserting a new character into the first term, or (v) adding or removing a space between two sequential characters in the first term.

In some embodiments, the act of receiving the natural language query can involve receiving a portion of the natural language query, generating a plurality of query suggestions, transmitting, to the client device, the plurality of query suggestions for display by the client device, and receiving, from the client device, the natural language query, where the natural language query includes one of the query suggestions from the plurality of query suggestions. The plurality of query suggestions can be generated by applying, to the portion of the natural language query, a set of fuzzy matching rules for performing approximate matching. The set of fuzzy matching rules can include two or more of: (i) a first fuzzy matching rule of the set of fuzzy matching rules to remove one or more characters from the portion of the natural language query, (ii) a second fuzzy matching rule of the set of fuzzy matching rules to switch two or more characters in the portion of the natural language query with each other, (iii) a third fuzzy matching rule of the set of fuzzy matching rules to change one or more characters in the portion of the natural language query to other characters, or (iv) a fourth fuzzy matching rule of the set of fuzzy matching rules to insert one or more new characters into the portion of the natural language query.

Figure 10:
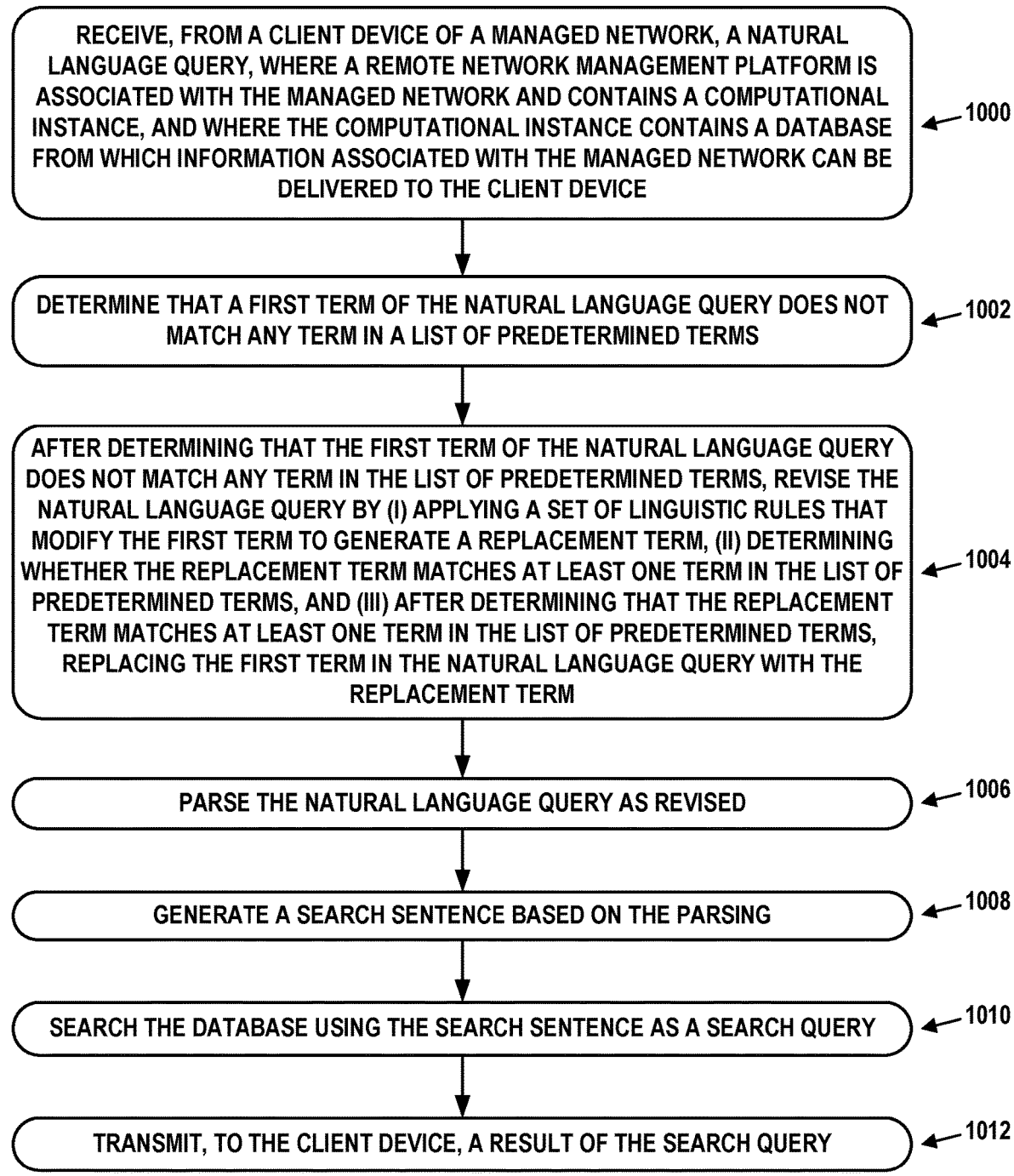
FIG. 10 is another flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. For the purposes of example, the process illustrated by FIG. 10 will be described as being carried out by a software application, such as software application 702, that is executable on a computing device of a computational instance of remote network management platform 320, such as computing device 700 of computational instance 322. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 involves receiving, from a client device of a managed network, a natural language query. The remote network management platform can be associated with the managed network and can contain the computational instance. The computational instance can contain a database from which information associated with the managed network can be delivered to the client device.

Block 1002 involves determining that a first term of the natural language query does not match any term in a list of predetermined terms.

Block 1004 involves, after determining that the first term of the natural language query does not match any term in the list of predetermined terms, revising the natural language query by (i) applying a set of linguistic rules that modify the first term to generate a replacement term, (ii) determining whether the replacement term matches at least one term in the list of predetermined terms, and (iii) after determining that the replacement term matches at least one term in the list of predetermined terms, replacing the first term in the natural language query with the replacement term.

Block 1006 involves parsing the natural language query as revised.

Block 1008 involves generating a search sentence based on the parsing.

Block 1010 involves searching the database using the search sentence as a search query.

Block 1012 involves transmitting, to the client device, a result of the search query.

In some embodiments, the set of linguistic rules can include one or more of (i) removing a character from the first term, (ii) switching two characters in the first term with each other, (iii) changing one character in the first term to another character, (iv) inserting a new character into the first term, or (v) adding or removing a space between two sequential characters in the first term.

In some embodiments, the set of linguistic rules can include a set of fuzzy matching rules for performing approximate matching. In such embodiments, the act of applying the set of linguistic rules that modify the first term to generate the replacement term can involve generating a plurality of candidate replacement terms by applying two or more of a plurality of fuzzy matching rules of the set of fuzzy matching rules to the first term. The plurality of fuzzy matching rules can include (i) a first fuzzy matching rule of the set of fuzzy matching rules to remove one or more characters from the first term, (ii) a second fuzzy matching rule of the set of fuzzy matching rules to switch two or more characters in the first term with each other, (iii) a third fuzzy matching rule of the set of fuzzy matching rules to change one or more characters in the first term to other characters, or (iv) a fourth fuzzy matching rule of the set of fuzzy matching rules to insert one or more new characters into the first term. In such embodiments, the act of applying the set of linguistic rules that modify the first term to generate the replacement term can also involve generating the plurality of candidate replacement terms by applying the two or more of the plurality of fuzzy matching rules to the first term such that no more than a threshold total number of fuzzy-matching-rule applications are made across the two or more of the plurality of fuzzy matching rules.

In some embodiments, the act of receiving the natural language query can involve receiving a portion of the natural language query, generating a plurality of query suggestions, transmitting, to the client device, the plurality of query suggestions for display by the client device, and receiving, from the client device, the natural language query, where the natural language query includes one of the query suggestions from the plurality of query suggestions. The plurality of query suggestions can be generated by applying, to the portion of the natural language query, a set of fuzzy matching rules for performing approximate matching. The set of fuzzy matching rules can include two or more of: (i) a first fuzzy matching rule of the set of fuzzy matching rules to remove one or more characters from the portion of the natural language query, (ii) a second fuzzy matching rule of the set of fuzzy matching rules to switch two or more characters in the portion of the natural language query with each other, (iii) a third fuzzy matching rule of the set of fuzzy matching rules to change one or more characters in the portion of the natural language query to other characters, or (iv) a fourth fuzzy matching rule of the set of fuzzy matching rules to insert one or more new characters into the portion of the natural language query.

In some embodiments, the act of parsing the natural language query as revised can involve parsing the natural language query as revised using a plurality of context-free grammar rules in BNF. The plurality of context-free grammar rules can include an extended context-free grammar rule that defines a non-terminal symbol and comprises a Boolean NOT operator that eliminates one or more potential definitions of the non-terminal symbol from consideration when parsing the natural language query. Additionally or alternatively, the plurality of context-free grammar rules can include a second extended context-free grammar rule that comprises a Boolean AND operator that specifies a number of terminal symbols to consider as a single terminal symbol. Additionally or alternatively, the plurality of context-free grammar rules can include an extended context-free grammar rule that comprises a regular expression, where the regular expression includes one or more wildcard characters, and where each wildcard character of the one or more wildcard characters acts as a respective placeholder for (i) one or more other characters or (ii) an empty string. Additionally or alternatively, the plurality of context-free grammar rules can include an extended context-free grammar rule that comprises a metadata term that triggers the computing device to replace the metadata term with corresponding metadata, where the corresponding metadata is a term selected from a list of terms that are each mapped to respective metadata terms and each relate to an entity that is associated with the managed network.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a remote network management platform associated with a managed network and containing a computational instance, wherein the managed network comprises a client device, and wherein the computational instance contains a database from which information associated with the managed network can be delivered to the client device;
a software application, executable on one or more processors of a computing device of the computational instance, and configured to cause the computing device to:
receive, from the client device, a natural language query;
parse the natural language query using a plurality of context-free grammar rules in Backus-Naur form (BNF), wherein the plurality of context-free grammar rules includes a set of extended context-free grammar rules, wherein a first extended context-free grammar rule of the set defines a non-terminal symbol and comprises a combination of a Boolean AND operator and a Boolean NOT operator that eliminates one or more potential definitions of the non-terminal symbol from consideration when parsing the natural language query and specifies a number of terminal symbols to consider as a single terminal symbol;
generate a search sentence based on the natural language query as parsed;
search the database using the search sentence as a search query; and
transmit, to the client device, a result of the search query.

2. The system of claim 1, wherein a second extended context-free grammar rule of the set comprises a second Boolean AND operator that specifies a second number of terminal symbols to consider as a second single terminal symbol.

3. The system of claim 1, wherein a second extended context-free grammar rule of the set comprises a regular expression, wherein the regular expression includes one or more wildcard characters, and wherein each wildcard character of the one or more wildcard characters acts as a respective placeholder for (i) one or more other characters or (ii) an empty string.

4. The system of claim 1, wherein a second extended context-free grammar rule of the set comprises a metadata term that triggers the computing device to replace the metadata term with corresponding metadata, wherein the corresponding metadata is a term selected from a list of terms that are each mapped to respective metadata terms and each relate to an entity that is associated with the managed network.

5. The system of claim 4, wherein the corresponding metadata is stored at one or more of the database or a second database contained within the managed network, and
wherein replacing the metadata term with the corresponding metadata comprises retrieving the corresponding metadata from one or more of the database or the second database and then replacing the metadata term with the corresponding metadata.

6. The system of claim 1, wherein the software application is further configured to cause the computing device to:
determine that a first term of the natural language query does not match any term in a list of predetermined terms; and
after determining that the first term of the natural language query does not match any term in the list of predetermined terms, revise the natural language query by (i) applying a set of linguistic rules that modify the first term to generate a replacement term, (ii) determining whether the replacement term matches at least one term in the list of predetermined terms, and (iii) after determining that the replacement term matches at least one term in the list of predetermined terms, replacing the first term in the natural language query with the replacement term,
wherein parsing the natural language query using the plurality of context-free grammar rules in BNF comprises parsing the natural language query as revised using the plurality of context-free grammar rules in BNF.

7. The system of claim 6, wherein the set of linguistic rules comprises one or more of (i) removing a character from the first term, (ii) switching two characters in the first term with each other, (iii) changing one character in the first term to another character, (iv) inserting a new character into the first term, or (v) adding or removing a space between two sequential characters in the first term.

8. The system of claim 1, wherein receiving the natural language query comprises:
receiving a portion of the natural language query;
generating a plurality of query suggestions by applying, to the portion of the natural language query, a set of fuzzy matching rules for performing approximate matching, wherein the set of fuzzy matching rules comprises two or more of: (i) a first fuzzy matching rule of the set of fuzzy matching rules to remove one or more characters from the portion of the natural language query, (ii) a second fuzzy matching rule of the set of fuzzy matching rules to switch two or more characters in the portion of the natural language query with each other, (iii) a third fuzzy matching rule of the set of fuzzy matching rules to change one or more characters in the portion of the natural language query to other characters, or (iv) a fourth fuzzy matching rule of the set of fuzzy matching rules to insert one or more new characters into the portion of the natural language query;
transmitting, to the client device, the plurality of query suggestions for display by the client device; and
receiving, from the client device, the natural language query, wherein the natural language query includes one of the query suggestions from the plurality of query suggestions.

9. A method performed by a software application executable on a computing device of a computational instance, the method comprising:
receiving, from a client device of a managed network, a natural language query, wherein a remote network management platform is associated with the managed network and contains the computational instance, and wherein the computational instance contains a database from which information associated with the managed network can be delivered to the client device;
parsing the natural language query using a plurality of context-free grammar rules in Backus-Naur form (BNF), wherein the plurality of context-free grammar rules includes a set of extended context-free grammar rules, wherein a first extended context-free grammar rule of the set defines a non-terminal symbol and comprises a combination of a Boolean AND operator and a Boolean NOT operator that eliminates one or more potential definitions of the non-terminal symbol from consideration when parsing the natural language query and specifies a number of terminal symbols to consider as a single terminal symbol;
generating a search sentence based on the natural language query as parsed;
searching the database using the search sentence as a search query; and
transmitting, to the client device, a result of the search query.

10. The method of claim 9, wherein a second extended context-free grammar rule of the set comprises a second Boolean AND operator that specifies a second number of terminal symbols to consider as a second single terminal symbol.

11. The method of claim 9, wherein a second extended context-free grammar rule of the set comprises a regular expression, wherein the regular expression includes one or more wildcard characters, and wherein each wildcard character of the one or more wildcard characters acts as a respective placeholder for (i) one or more other characters or (ii) an empty string.

12. The method of claim 9, wherein a second extended context-free grammar rule of the set comprises a metadata term that triggers the computing device to replace the metadata term with corresponding metadata, wherein the corresponding metadata is a term selected from a list of terms that are each mapped to respective metadata terms and each relate to an entity that is associated with the managed network.

13. The method of claim 9, further comprising:
determining that a first term of the natural language query does not match any term in a list of predetermined terms; and
after determining that the first term of the natural language query does not match any term in the list of predetermined terms, revising the natural language query by (i) applying a set of linguistic rules that modify the first term to generate a replacement term, (ii) determining whether the replacement term matches at least one term in the list of predetermined terms, and (iii) after determining that the replacement term matches at least one term in the list of predetermined terms, replacing the first term in the natural language query with the replacement term, wherein parsing the natural language query using the plurality of context-free grammar rules in BNF comprises parsing the natural language query as revised using the plurality of context-free grammar rules in BNF.

14. The method of claim 13, wherein the set of linguistic rules comprises one or more of (i) removing a character from the first term, (ii) switching two characters in the first term with each other, (iii) changing one character in the first term to another character, (iv) inserting a new character into the first term, or (v) adding or removing a space between two sequential characters in the first term.

15. An article of manufacture including a non-transitory computer-readable medium, having stored thereon program instructions that, upon execution by a computing device of a computational instance, cause the computing device to perform operations comprising:

receiving, from a client device of a managed network, a natural language query, wherein a remote network management platform is associated with the managed network and contains the computational instance, and wherein the computational instance contains a database from which information associated with the managed network can be delivered to the client device;

parsing the natural language query using a plurality of context-free grammar rules in Backus-Naur form (BNF), wherein the plurality of context-free grammar rules includes a set of extended context-free grammar rules, wherein a first extended context-free grammar rule of the set defines a non-terminal symbol and comprises a combination of a Boolean AND operator and a Boolean NOT operator that eliminates one or more potential definitions of the non-terminal symbol from consideration when parsing the natural language query and specifies a number of terminal symbols to consider as a single terminal symbol;

generating a search sentence based on the natural language query as parsed;

searching the database using the search sentence as a search query; and transmitting, to the client device, a result of the search query.

16. The article of manufacture of claim 15, wherein a second extended context-free grammar rule of the set comprises a regular expression, wherein the regular expression includes one or more wildcard characters, and wherein each wildcard character of the one or more wildcard characters acts as a respective placeholder for (i) one or more other characters or (ii) an empty string.

17. The article of manufacture of claim 15, wherein a second extended context-free grammar rule of the set comprises a metadata term that triggers the computing device to replace the metadata term with corresponding metadata, wherein the corresponding metadata is a term selected from a list of terms that are each mapped to respective metadata terms and each relate to an entity that is associated with the managed network.

* * * * *